(12) United States Patent
Krasnoff

(10) Patent No.: US 11,220,245 B2
(45) Date of Patent: Jan. 11, 2022

(54) BRAKING SYSTEM

(71) Applicant: Curren Krasnoff, Santa Monica, CA (US)

(72) Inventor: Curren Krasnoff, Santa Monica, CA (US)

(73) Assignee: Duplicent, LLC, Santa Monica, CA (US)

( * ) Notice: Subject to any disclaimer, the term of this patent is extended or adjusted under 35 U.S.C. 154(b) by 105 days.

(21) Appl. No.: 16/063,783

(22) PCT Filed: Dec. 28, 2016

(86) PCT No.: PCT/US2016/069038
§ 371 (c)(1),
(2) Date: Jun. 19, 2018

(87) PCT Pub. No.: WO2017/117303
PCT Pub. Date: Jul. 6, 2017

(65) Prior Publication Data
US 2019/0263365 A1    Aug. 29, 2019

Related U.S. Application Data

(60) Provisional application No. 62/271,987, filed on Dec. 28, 2015.

(51) Int. Cl.
*B60T 1/14* (2006.01)
*B61H 7/06* (2006.01)
*F16D 63/00* (2006.01)

(52) U.S. Cl.
CPC ............... *B60T 1/14* (2013.01); *B61H 7/06* (2013.01); *F16D 63/008* (2013.01)

(58) Field of Classification Search
CPC ........... B60T 1/14; B61H 7/06; F16D 63/008; B62D 49/0635
See application file for complete search history.

(56) References Cited

U.S. PATENT DOCUMENTS 1,334,644 A * 3/1920 Atherton ............... B60T 1/14
                                              188/5
2,871,986 A * 2/1959 Polovitch ............. B60T 1/14
                                              188/5

(Continued)

FOREIGN PATENT DOCUMENTS

CN       2642608 Y       9/2004
DE        842455 C       6/1952

(Continued)

OTHER PUBLICATIONS

Extended European Search Report for EP App. No. 16882615.4, dated Sep. 23, 2019, 10 pages.
International Search Report and Written Opinion for International Application No. PCT/US2016/069038, dated Apr. 17, 2017, 16 pages.

*Primary Examiner* — Xuan Lan Nguyen
(74) *Attorney, Agent, or Firm* — Foley & Lardner LLP

(57) ABSTRACT

Devices, systems, and methods are described that provide an braking system for a motor vehicle. The braking system extends a friction device from beneath the vehicle to contact the driving surface. Orientation of the friction device and forces applied to the braking device can be adjusted during the braking procedure.

In some braking devices forces generated during braking are directed to a load bearing arm and supporting frame, thereby minimizing damage to actuating devices. The friction device can be retracted after use, permitting normal vehicle operation.

7 Claims, 21 Drawing Sheets

(56) References Cited

U.S. PATENT DOCUMENTS

| | | | | |
|---|---|---|---|---|
| 3,722,630 | A | * | 3/1973 | Wakabayashi ............ B60T 1/14 188/4 R |
| 3,799,293 | A | * | 3/1974 | Howells .................... B60T 1/14 188/5 |
| 4,613,015 | A | * | 9/1986 | Skrzypek ................. B60T 8/56 188/6 |
| 6,220,397 | B1 | * | 4/2001 | Beng ........................ B60B 39/00 188/16 |
| 6,401,876 | B1 | * | 6/2002 | Boros ....................... B60T 1/14 188/2 R |
| 8,082,101 | B2 | * | 12/2011 | Stein .................. G06K 9/00805 701/301 |
| 8,356,685 | B2 | * | 1/2013 | Baumann .................. B60T 1/14 180/164 |
| 8,827,047 | B2 | * | 9/2014 | Baker ....................... B60T 1/14 188/5 |
| 9,038,787 | B1 | | 5/2015 | Al-Mubarak |
| 2011/0198161 | A1 | * | 8/2011 | Lomazzo .................. B60T 1/14 188/5 |
| 2013/0037355 | A1 | | 2/2013 | Baker et al. |
| 2015/0203080 | A1 | | 7/2015 | Modi et al. |

FOREIGN PATENT DOCUMENTS

| | | |
|---|---|---|
| DE | 40 33 147 A1 | 4/1992 |
| DE | 20 2004 005 845 U1 | 12/2004 |
| DE | 10 2012 003 869 A1 | 10/2012 |
| DE | 10 2014 108 387 A1 | 12/2015 |
| ES | 2061350 A2 | 12/1994 |
| JP | 02-267054 A | 10/1990 |
| JP | 10-217922 A | 8/1998 |
| JP | 2007-196892 A | 8/2007 |
| JP | 2014-051260 A | 3/2014 |
| WO | WO-2010/012082 A1 | 2/2010 |
| WO | WO-2014168529 A1 * 10/2014 ........... F16D 63/008 |

* cited by examiner

BRAKING SYSTEM

This application claims priority to U.S. Provisional Application No. 62/271,987 filed on Dec. 28, 2015. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is vehicle braking systems, particularly emergency braking systems.

BACKGROUND

The background description includes information that may be useful in understanding the present invention. It is not an admission that any of the information provided herein is prior art or relevant to the presently claimed invention, or that any publication specifically or implicitly referenced is prior art.

Over 37,000 people die in road crashes in the United States each year. Beyond this, the economic impacts are substantial. Road crashes cost the U.S. $230.6 billion per year, or an average of $820 per person. Although some of these collisions are unavoidable, in many instances such crashes can, potentially, be prevented.

To date, most attempts to improve automobile safety have focused primarily on reducing the effects of impacts resulting from collisions. Examples include improvements in the design of safety belts, mandating the use of properly fitted child seats, the introduction of air bags in steering wheels and elsewhere in the vehicle, and the inclusion of kinetic energy absorbing bumpers and crumple zones in vehicle design. While such efforts have been successful in reducing the numbers of vehicle accident-related deaths and reducing the severity of accident-related injuries, they do not contribute to reducing the actual number of accidents.

More recently active vehicle crash avoidance systems have been implemented in some luxury vehicles. Such systems typically rely on proximity sensors and/or artificial vision systems to monitor the vehicle's immediate environment. When a potentially hazardous situation is identified (for example, an unacceptably short distance between vehicles) the system can apply the vehicle's brakes in order to reduce speed, potentially avoiding an impact. Such systems, however, are reliant on the normal functioning of the vehicle's braking system and drive train. As such there are a number of circumstances (for example, loss of brake hydraulic pressure) under which such systems can provide little, if any, protective effect.

Attempts have been made to provide auxiliary braking systems that can be deployed in order to provide additional braking power to a moving vehicle. For example, U.S. Pat. No. 9,038,787 (to Al-Mubarak): describes an auxiliary braking system that vertically deploys a resilient "blade" into contact with the road surface in front of the vehicle's front wheels. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply. The taught system, however, appears to rely on gravity to bring the blade into contact with the road surface, and thus provides little control over braking force once the system is activated.

United States Patent Application Publication No. 2011/0198161 (to Lomazzo): describes an auxiliary vehicle braking system that uses a force applicator to deploy a braking pad that contacts the road surface. The taught system, however, utilizes flat, "parallel" placement of the brake pad, placing considerable lateral strain on support structures and force applicators coupled to the braking pad. United States Patent Publication No. 2013/0037355 (to Baker et al) describes an auxiliary braking mechanism that deploys a braking pad using a complex, asymmetric, multiple pivoting arm mechanism that contacts the pad with road surface. The described mechanism permits the system to initially apply the braking pad to the road surface at an angle, and thus provides a degree of control over the applied braking force. It is unclear, however, if the elongated, elongated rocking-arm mechanism used to apply the braking pad is suitable to accept the resulting mechanical stress.

Thus, there is still a need for an emergency braking system that can consistently and effectively reduce vehicle speed in an emergency situation.

SUMMARY OF THE INVENTION

The inventive subject matter provides apparatus, systems and methods that provide a braking system for a motor vehicle that does not rely on friction of the wheels or tires with the road surface. The system deploys a friction device or braking pad from beneath the vehicle to contact the driving surface. In embodiments of the inventive concept the degree of braking force applied can be controlled by modulating the force applied between the vehicle and the braking pad and/or the angle of contact between the friction device and the road surface. In some embodiments of the inventive concept force applicators utilized to move the braking pad are not directly coupled to the vehicle or vehicle frame. In other embodiments of the inventive concept such force applicators move as the deployment mechanism articulates, thereby avoiding direct application of strain on the force applicator while braking. In still other embodiments of the inventive concept strain on the braking mechanism during braking is distributed over one or more tracks, over which portions of the deployment mechanism move during braking operations.

One embodiment of the inventive concept is an emergency braking system for use in a vehicle that includes a deployment mechanism coupled to an undercarriage of the vehicle, wherein the deployment mechanism has a retracted configuration and an extended configuration, and a friction device coupled to the deployment mechanism. The friction device is not in contact with a driving surface when the deployment mechanism is in the retracted configuration and is in to contact with the driving surface when the deployment mechanism is in the extended configuration. In such a braking system the deployment mechanism can include a linear force applicator such as a pneumatic device, a hydraulic device, a solenoid device, an explosive or pyrotechnic device, and/or a linear electric motor. The friction device can include a friction surface, which is brought into contact with the driving surface when the deployment mechanism is in the extended configuration. Such a friction surface can have a higher frictional coefficient than a rubber utilized in manufacturing automobile tires, and can be replaced. Some embodiments include two or more friction surfaces. In such embodiments friction surfaces can be arranged to rotate independently and/or relative to one another when the deployment mechanism is in the extended configuration. In some embodiments the friction surface is a laminated structure with two or more layers, which can partially overlap. In other embodiments the friction surface is a closed loop that rotates when the deployment mechanism is in the extended configuration. Such braking systems can include a regulatory mechanism configured to control the rotation of the friction surface(s).

In some embodiments of the emergency braking system the system can include two or more of brake subassemblies, wherein each one of the brake subassemblies include a subassembly deployment mechanism and a subassembly friction device. Such brake subassemblies is arranged in a linear fashion or as a grid, and can be activated independently of one another.

In some embodiments of the emergency braking system a pivot can be positioned between the deployment mechanism and the undercarriage of the vehicle, and/or between the friction device and the deployment mechanism. Regulatory devices can be included that vary the rotational resistance of such pivots.

Another embodiment of the inventive concept is a method of providing emergency braking for a vehicle that includes detecting an impending emergency event and extending a friction device of an emergency braking system from an undercarriage of the vehicle, where extending the friction device brings the friction device into contact with a driving surface to provide sufficient friction to reduce a stopping distance of the vehicle to less than 70% of a stopping distance of an similar vehicle that is not equipped with the friction device. In such a method the vehicle can include an onboard computer that initiates extension of the friction device in response to detection of the impending emergency event. In some embodiments movement of a brake pedal of the vehicle is used to detect the impending emergency event. The vehicle can include onboard sensors that transmit data to the onboard computer to provide detection of an impending emergency event. In such methods the friction device can include a rotating friction surface that is moderated by a regulatory mechanism (for example, under the control of an onboard computer). Similarly, pressure applied to the driving surface by the friction device and/or the contact angle between the friction device and the driving surface can be controlled by an onboard computer, and varied during the course of a response to an impending emergency. An emergency braking system used in such methods can include comprises two or more frictional surfaces that are extended independently. Similarly, an emergency braking system used in such a method can include a deployment mechanism that is coupled to and interposed between both the friction device and the undercarriage, and further include a pivot interposed between the deployment mechanism and the undercarriage and/or a pivot between the deployment mechanism and the friction device that permit(s) modification of the deployment angle of the friction device during braking.

32. The method of claim 22 or claim 30, wherein the emergency braking system further comprises a deployment mechanism that is coupled to and interposed between both the friction device and the undercarriage, and further comprises a second pivot interposed between the deployment mechanism and the friction device, wherein the pivot is rotated to modify a deployment angle of the friction device during braking.

Another embodiment of the inventive concept is an emergency braking system for use in a vehicle that includes a deployment mechanism coupled to an undercarriage of the vehicle, where the deployment mechanism has a retracted configuration and an extended configuration and includes a track and a load bearing bar pair. The load bearing arm pair includes a first load bearing bar that is coupled to a second load bearing arm at a pivot point to permit rotation. Each of the first load bearing bar and the second load bearing bar include an upper segment positioned between the undercarriage and the pivot point, and the upper segment of either of the first load bearing bar or the second load bearing bar is coupled to the track in a manner that permits it to slide. The braking system further includes a friction device coupled to the deployment mechanism, and each of the first load bearing bar and the second load bearing bar include a lower segment positioned between the pivot point and the friction device. The braking system also includes a force applicator coupled to the first load bearing bar at a first terminus and to the second load bearing bar at a second terminus. In such a braking system the friction device is not in contact with a driving surface when the deployment mechanism is in a retracted configuration and is in to contact with the driving surface when the deployment mechanism is in an extended configuration. In some embodiments the first terminus of the force applicator is coupled to the upper segment of the first load bearing bar and the lower segment of the second load bearing bar. In such an arrangement extension of the force applicator transitions the emergency braking device between the retracted configuration and the extended configuration. The force applicator can be a pneumatic device, a hydraulic device, a solenoid device, an explosive or pyrotechnic device, and/or a linear electric motor. In some embodiments the emergency braking device can include a stopping point. For example the track can include a bore hole, and the upper segment of the upper segment of either of the first load bearing bar or the second load bearing bar can include a pin that engages the bore hole.

In some embodiments the emergency braking system can include a biasing member. In some embodiments the biasing member is a retracting biasing member, and the biasing member is coupled to the first load bearing arm and the second load bearing arm in parallel with the force applicator. In other embodiments the biasing member is an extending biasing member, and wherein the biasing member is coupled to the first load bearing arm and the second load bearing arm in opposition to the force applicator.

BRIEF DESCRIPTION OF THE DRAWINGS

FIG. 1A provides a schematic depiction of an emergency braking system of the inventive concept prior to deployment. FIG. 1B provides a schematic depiction of an emergency braking system of the inventive concept following deployment.

FIG. 2A depicts an example of a friction device of the inventive concept having an applied friction surface. FIG. 2B depicts an example of a friction device with a belt or closed loop friction surface. FIG. 2C depicts an example of a friction device with multiple rolling friction surfaces. FIG. 2D depicts an example of an alternative friction device with multiple rolling friction surface.

FIG. 3A schematically depicts an example of an emergency braking system of the inventive concept that shows a side view of a vehicle equipped with an emergency braking system that includes three braking subassemblies arranged in a linear fashion.

FIG. 3B schematically depicts an example of an emergency braking system of the inventive concept that shows a bottom view of a vehicle equipped with an emergency braking system that includes four braking subassemblies arranged in a linear fashion.

FIG. 4A schematically depicts application of the friction device at a first angle at T0 (initiation of emergency braking) in a device with the pivot positioned at the deployment mechanism attachment point.

FIG. 4B schematically depicts application of the friction device at a second angle at T1 (midway through emergency braking) in a device with the pivot positioned at the deployment mechanism attachment point.

FIG. 4C schematically depicts application of the friction device at a third angle at T2 (towards the end of emergency braking) in a device with the pivot positioned at the deployment mechanism attachment point.

FIG. 5A schematically depicts application of the friction device at a first angle at T0 (initiation of emergency braking) in a device with the pivot positioned at the friction device attachment point.

FIG. 5B schematically depicts application of the friction device at a second angle at T1 (midway through emergency braking) in a device with the pivot positioned at the friction device attachment point.

FIG. 5C schematically depicts application of the friction device at a third angle at T2 (towards the end of emergency braking) in a device with the pivot positioned at the friction device attachment point.

FIG. 6A schematically depicts application of the friction device at a first angle at T0 (initiation of emergency braking) in a device with pivots positioned at both the deployment mechanism and friction device attachment points. In this example the friction device initially contacts the driving surface at an angle.

FIG. 6B schematically depicts application of the friction device at a first angle at T0 (initiation of emergency braking) in a device with pivots positioned at both the deployment mechanism and friction device attachment points. In this example the friction device initially contacts the driving surface while essentially parallel to the driving surface.

FIG. 6C schematically depicts application of the friction device at a second angle at T1 (midway through emergency braking) in a device with the pivot positioned at both the deployment mechanism and friction device attachment points.

FIG. 6D schematically depicts application of the friction device at a third angle at T2 (towards the end of emergency braking) in a device with the pivot positioned at both the deployment mechanism and friction device attachment points.

FIG. 7A schematically depicts application of the friction device at a first position at T0 (initiation of emergency braking) in a device with multiple deployment mechanisms coupled to a single friction device (in this instance a sled). In this example the friction device initially contacts the driving surface at an angle.

FIG. 7B schematically depicts application of the friction device at a second position at T1 (midway through emergency braking) in a device with multiple deployment mechanisms coupled to a single friction device (in this instance a sled). As shown, individual deployment devices can apply different amounts of force during the emergency braking process.

FIGS. 8A and 8B schematically depict a braking system of the inventive concept in which braking force is transferred to load bearing arms of the deployment mechanism. FIG. 8A shows such a braking system in the closed or retracted position. FIG. 8B shows such a braking system in the extended or active position.

FIG. 9 depicts a braking system of the inventive concept that utilizes a pair of load bearing arm subassemblies, each incorporating a pair of force applicators.

FIG. 10A depicts a system utilizing a pivoting or rotating length bar to impel a friction device towards the driving surface, with the system in closed or retracted position. FIG. 10B depicts the system of FIG. 10A in extended (i.e. in use) position. FIG. 10C depicts an enlarged view of the interface between a force applicator and a length bar of the braking system. FIG. 10D depicts a top-down view of such a system in the retracted position. FIG. 10E depicts a top-down view of such a system in the extended position. FIG. 10F depicts such side view of such a system in a retracted position, as mounted in a typical motor vehicle. FIG. 10G depicts such side view of such a system in an extended position, as mounted in a typical motor vehicle.

FIG. 10H depicts an embodiment having two friction devices in a nested, parallel arrangement. FIG. 10I depicts an embodiment having two friction devices in an opposed arrangement. FIG. 10J depicts an embodiment having two friction devices in a nested, parallel arrangement. FIG. 10K depicts an embodiment having a single friction device with two contact surfaces, where the pair of contact surfaces is actuated in a nested, parallel arrangement.

FIG. 10N depicts a side view of such a braking system in the retracted configuration as mounted in a typical motor vehicle. Note that elements of the vehicle obscure the view of braking system components. FIG. 10O depicts a side view of such a braking system in the extended configuration as mounted in a typical motor vehicle.

FIGS. 11A and 11C depict such a braking system in the retracted configuration. FIGS. 11B and 11D depict such a braking system in the extended configuration.

DETAILED DESCRIPTION

Figure 1A:
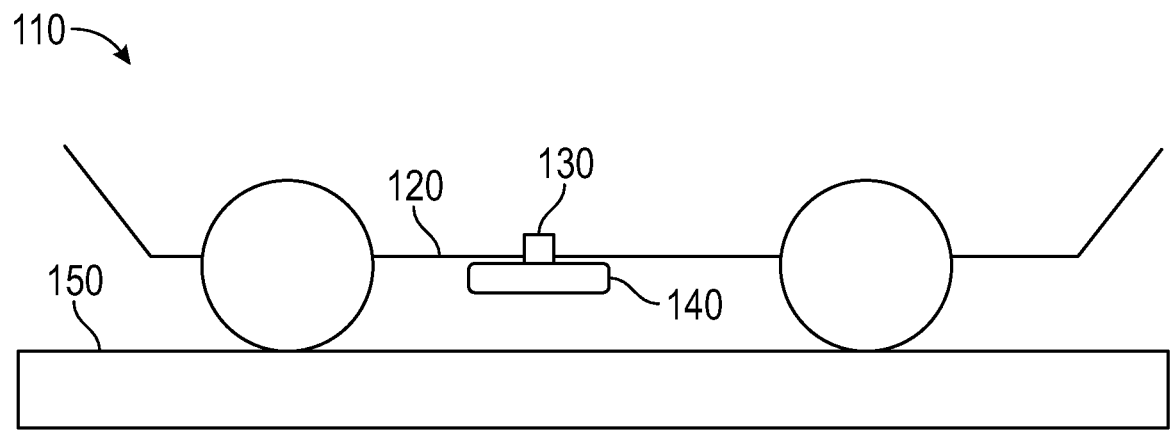
FIGS. 1A and 1B.

The following description includes information that can be useful in understanding the present invention. It is not an admission that any of the information provided herein is prior art or relevant to the presently claimed invention, or that any publication specifically or implicitly referenced is prior art.

Various objects, features, aspects and advantages of the inventive subject matter will become more apparent from the following detailed description of preferred embodiments, along with the accompanying drawing/FIGS. in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventive subject matter provides apparatus, systems and methods for an emergency braking system that can be used to prevent an oncoming collision. In an apparatus, system, or method of the inventive concept a vehicle is provided with an onboard computer that is programmable to activate an emergency braking system. Such an emergency braking system can include a friction device that can be deployed to make contact with the driving surface. Contact with the driving surface results in the conversion of at least a portion of the kinetic energy of the moving vehicle to heat through the creation of significant friction between the friction device and the driving surface. In some embodiments this effect is enhanced by ablation of at least a portion of the friction device. This results in emergency friction braking of the vehicle, diminishing its speed. For example, activation of the emergency braking system can reduce the stopping distance of a vehicle so equipped to 90%, 80%, 70%, 60%, 50%, 40%, 30%, or less than 30% of that of a corresponding vehicle that is not equipped with the emergency braking system. Such diminished speed can permit the vehicle to avoid impact, or can reduce the damage resulting from an unavoidable impact. Such emergency friction braking can act in concert with conventional braking applied through the wheels of the vehicle or can be independent of conventional braking.

Inventors contemplate that an emergency braking system of the inventive concept can be applied to a wide variety of wheeled and non-wheeled vehicles. For example, such braking systems can be utilized in motor vehicles have 2, 3, 4, 6, 8, 10, 12, 14, 16, 18, or more wheels. Similarly, braking systems of the inventive concept can be utilized on wheeled transports that are non-powered or towed, such as trailers and similar storage or transport devices. Alternatively, braking devices of the inventive concept can be utilized with vehicles that run on tracks, such as passenger and/or freight trains, trolleys, street cars, etc. In some embodiments, braking systems of the inventive concept are utilized with commercial and/or non-commercial aircraft. In still other embodiments, braking systems of the inventive concept are utilized with commercial and/or non-commercial ships or boats.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be appreciated that the inventive subject matter provides apparatus, systems and methods that provide a braking system for a motor vehicle that does not rely on friction of the wheels or tires with the road surface. The system deploys a friction device or braking pad from beneath the vehicle to contact the road surface. In embodiments of the inventive concept the degree of braking force applied can be controlled by modulating the force applied between the vehicle and the braking pad and/or the angle of contact between the braking pad and the road surface. In some embodiments of the inventive concept force applicators utilized to move the braking pad are not directly coupled to the vehicle or vehicle frame. In other embodiments of the inventive concept such force applicators move as the deployment mechanism articulates, thereby avoiding direct application of strain on the force applicator while braking. In still other embodiments of the inventive concept strain on the braking mechanism during braking is distributed over one or more rails, over which portions of the deployment mechanism move during braking operations.

One should appreciate that the disclosed techniques provide many advantageous technical effects, including provision of additional braking capacity that is substantially decoupled from the drive train and/or wheel-associated braking system of a vehicle, thereby simplifying vehicle design while enhancing safety. In addition, such an emergency braking system can advantageously provide brake capacity in the event of a failure of the vehicle's primary brake system and/or hand brake system.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention. As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments an emergency braking system of the inventive concept can be initiated, at least in part, by actions taken by the driver. For example, depression of the vehicle's brake pedal past a predetermined point can be used to activate the emergency braking system. For example, depression of the vehicle's brake pedal past a predetermined activation point can be used to activate the emergency braking system. The driver could depress the brake pedal to a set point (e.g. 80%, 90%, etc. of the full travel path of the brake pedal) to deploy or activate the emergency braking device. Additionally, pressing the brake pedal past a predetermined activation point can further apply pressure through the emergency braking system, for example through a hydraulic or similar mechanism, to increase the amount of downward force exerted on the emergency braking system from the vehicle. In such an embodiment feedback (e.g. tactile feedback) can be transferred to the vehicle operator through the brake pedal. Similarly, sudden and/or rapid depression of the brake pedal can be used to activate the emergency braking system. In some embodiments the emergency braking system can be activated autonomously by the onboard computer, in response to data received from onboard sensors located on or in the vehicle. Examples of suitable sensors include infrared sensors, ultrasonic sensors, motion detectors, and cameras.

In some embodiments of the inventive concept a friction device used in the emergency braking system can be one or more rod(s), pad(s), bar(s), sled(s), shingles, or similar friction structures that is(are) equipped and positioned to bring a friction surface in contact with the driving surface. In such embodiments the friction device and/or friction surface can have a thickness of about 0.5 inches (1.3 cm), 1 inch (2.5 cm), 1.5 inches (3.8 cm), 2 inches (5.1 cm), 2.5 inches (6.4 cm), 3 inches (7.6 cm), 4 inches (10.2 cm), 5 inches (12.7 cm), 6 inches (15.2 cm), or more. In some embodiments the friction device or a friction surface associated with the friction device is deformable or pliant, which advantageously increases contact area when brought into contact with an irregular driving surface. Friction structures can be arranged in a set or series, where two or more rod(s), pad(s), bar(s), sled(s), and/or shingle(s) are placed next to each other on a single emergency braking device. Alternatively, in some embodiments a single rod, pad, bar, sled, and/or set of shingles can be used.

Such a friction device or friction devices can have any suitable configuration, including square, rectangular, curved, concave, and/or convex. Suitable friction devices can have complex configurations in which different portions of the device have different shapes. Such friction devices can have braking rod(s), pad(s), bar(s), sled(s), and/or shingle(s) arranged, for example, as brake elements in a series or in a looped belt configuration, where each brake element is fixed to a looped material such that the looped material is coupled with a speed reducing mechanism. Suitable speed reducing mechanisms include gears, hydraulic braking mechanisms, anti-skid braking mechanism, and so on. These serve to slow the rotation of the looped material and subsequently increase the braking power of the emergency braking system. Skidding of the friction device when in contact with the driving surface, with subsequent wear of the friction device surface (e.g. a friction pad) and marking of the driving surface is inevitable. It should be appreciated that embodiments in which the portion of the braking system that contacts the driving surface rotates, as described above, such skidding and wear can be reduced.

Figure 1B:
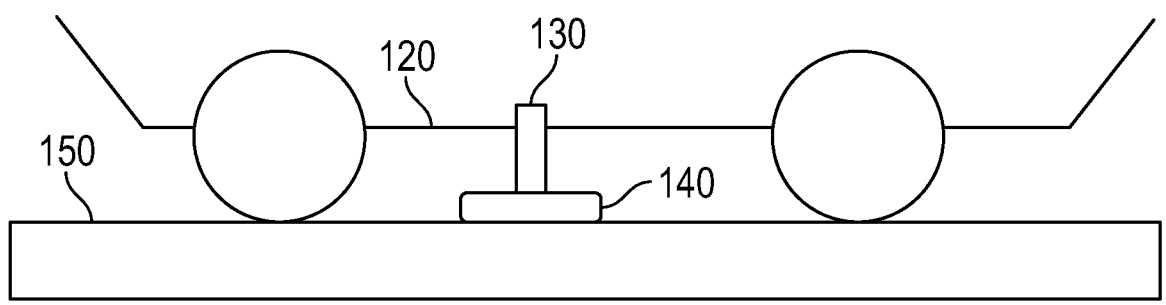

Such a friction device can be mounted to the underside of the vehicle (for example, to the undercarriage and/or frame), and deployed using a mechanism suitable to rapidly provide sufficient downwards mechanical force to provide efficient braking. Suitable deployment mechanisms include a force applicator, such as a pneumatic device, hydraulic device, and/or solenoid and/or other motors. Alternatively, a conventional motor used in concert with a belt/pulley system or similar rotational-to-linear force transduction mechanism can be used as at least part of a deployment mechanism. In some embodiments of the inventive concept the deployment mechanism can be controlled by the onboard computer to regulate the amount of force applied to the driving surface during an emergency braking procedure. An example of an emergency braking system (110) of the inventive concept prior to deployment or activation is shown in FIG. 1A. As shown, a deployment mechanism (130), which can include a force applicator, is coupled (either directly or indirectly) to one or more components of the vehicle undercarriage (120), such as elements of the vehicle frame. The deployment mechanism is also coupled to a friction device (140) that provides braking power when applied to a driving surface (150). An example of such an emergency braking system following deployment or activation is shown in FIG. 1B. As shown, on deployment extension of the deployment mechanism (130) extends to place the friction device (140) in contact with the driving surface (150). The resulting friction provides braking forces that are transferred (either directly or indirectly) to the vehicle frame (120). Such friction device can span a specified portion of the total area of the underside of the vehicle. For example, a friction device of the inventive concept can have an area that comes into contact with the driving surface when deployed that is 10%, 20%, 30%, 40%, 50%, 60%, 70%, 80%, 90%, 95%, or more than 95% of the total area of the underside of the vehicle.

Figure 2A:
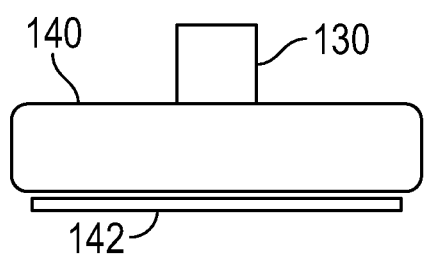
FIGS. 2A to 2D.
Figure 2B:
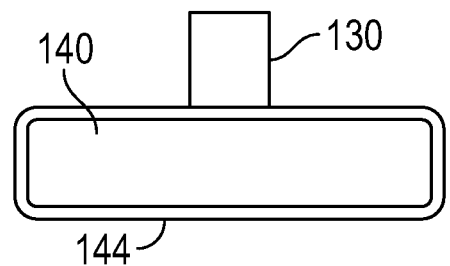
Figure 2C:
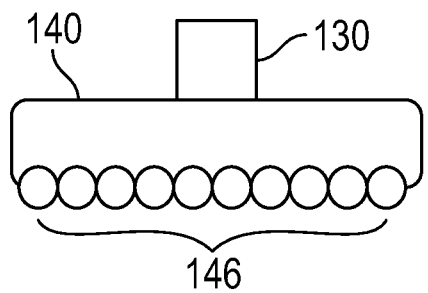
Figure 2D:
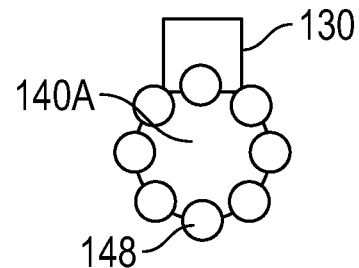

The surface of the friction device that contacts the driving surface on deployment (i.e. the friction surface or friction pad) can be at least partially composed of a high friction material or multiple high friction materials arranged in a series. In some embodiments the friction device can be primarily composed of such a high friction material. In other embodiments a friction device can include a supporting structure or plate that has a layer of high friction material on its lower surface, or that incorporates regions or devices that utilize such materials. For example, a friction device can include a friction surface, for example a coating or layer of high friction material positioned to come into contact with the driving surface when deployed. In some embodiments a friction device can include two or more distinct friction surfaces, which can have different friction properties. Suitable materials include polymers, natural and synthetic rubbers, silicones, and rigid gels. In a preferred embodiment of the inventive concept the material of the friction surface has a coefficient of friction that exceeds that of conventional rubbers used in the production of automobile tires when brought into contact with an asphalt or concrete driving surface. Examples of friction device having such a friction surface or friction device(s) are shown in FIGS. 2A to 2D. As shown in FIG. 2A, a deployment mechanism (130) can be coupled to a friction device (140) that incorporates a layer (142) of high friction materials on its lower surface. FIG. 2B depicts an alternative embodiment in which a deployment mechanism (130) is coupled to a friction device (140) that incorporates a band or belt of friction material (144) that surrounds the friction device. Such a band or belt of friction material can rotate around the friction device during braking, advantageously reducing wear on the friction device. FIG. 2C depicts another embodiment, in which the deployment mechanism (130) is coupled to a friction device (140) that includes a set of rods, bearings, and/or rollers (146) over at least a portion of its lower surface. Such bearings or rollers rotate on contacting the driving surface during braking operations, reducing wear on the friction device while retaining braking capacity. FIG. 2D depicts a related embodiment, in which the deployment mechanism (130) is coupled to a rotating friction surface (140A), which in turn includes a set of rollers or bearings (148). On contacting the driving surface during braking both the rollers or bearing and the rotating friction surface rotate. It should be appreciated that rotating features such as those depicted in FIG. 2B to 2D can be coupled to a gearing or braking mechanism that controls the rate of rotation and can be used to modulate braking power during braking operations. In such embodiments the friction device can include a rotation regulator that modified or controls the rate of rotation, for example a gearing device, a friction brake, or other device that increases rotational resistance. Such a rotation regulator can be used slow the rate of rotation relative to an unregulated rotating structure and so enhance the braking effect. In some embodiments of the inventive concept the rotation regulator can be controlled by the onboard computer, and the rate of rotation modified during the emergency braking procedure.

In some embodiments the friction surface can include a pattern (for example a grid, rhomboid, triangular, square, and/or hexagonal tread pattern) that enhances friction. Such a pattern can be produced by molding or machining of the friction surface. In other embodiments the friction surface can be a laminated structure, where worn layers are shed during use to expose fresh friction surface. Such laminated structures can include 2, 5, 10, 20, 30 40 50, or more than 50 layers. Layers of such laminated structures can completely or partially (e.g. similar to roofing tiles) overlap. In some embodiments of the inventive concept the friction surface of the friction device is mounted reversibly, and can be replaced after one or more use(s). In a preferred embodiment an edge (for example, the leading edge) of a friction surface can be angled and/or rounded. As noted above, in some embodiments the friction surface can be flexible or pliant, thereby allowing it to conform to an irregular driving surface.

Figure 3A:
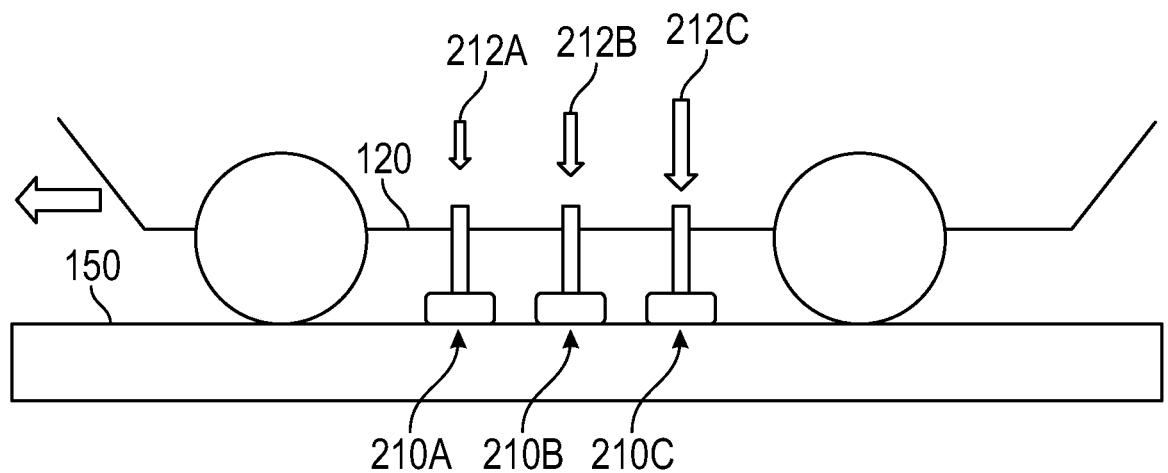
FIG. 3A.
Figure 3B:
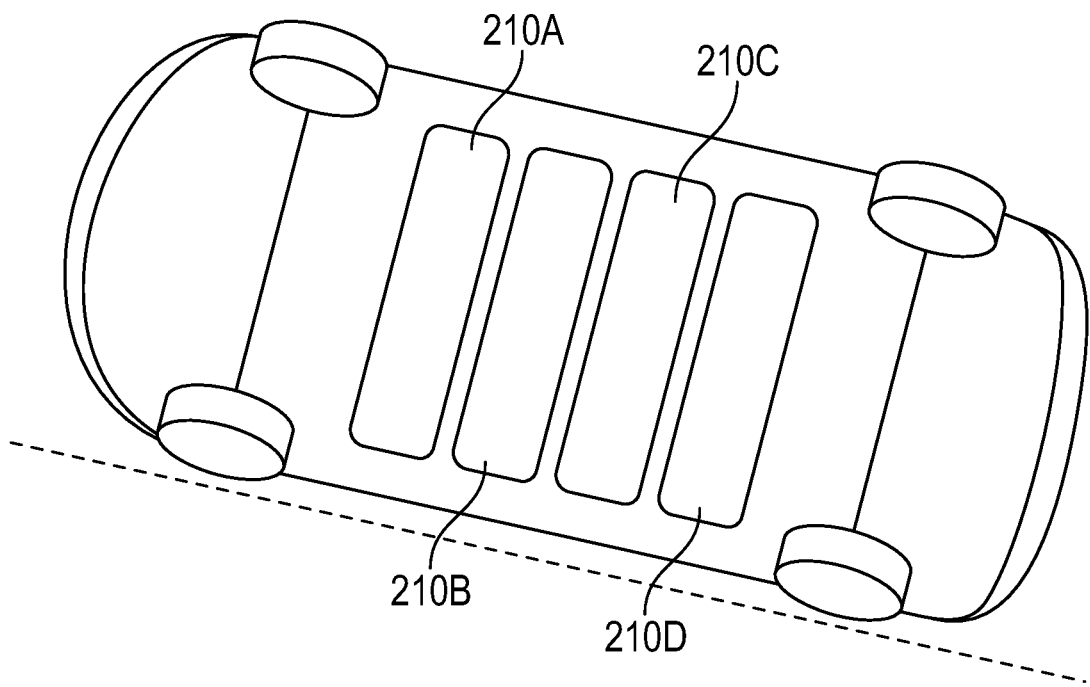
FIG. 3B.

In some embodiments of the inventive concept an emergency braking system can include two or more braking subassemblies that each include a deployment mechanism, friction device, and friction surface. In such an embodiment different braking subassemblies can be deployed at different points along the undercarriage of the vehicle during an emergency braking procedure. For example, a series of braking subassemblies can be arranged in a linear fashion along the major or travel axis of the vehicle. An example of such an embodiment is shown in FIGS. 3A and 3B. FIG. 3A depicts a braking system that includes three braking subassemblies (210A, 210B, and 210C), each of which can be arranged as the braking systems shown in FIGS. 1A and 2A to 2D. Each of the respective deployment mechanisms of such subassemblies is coupled, either directly or indirectly, to the undercarriage (120) of the vehicle and can be operated independently. For example, in FIG. 3A the system is shown as deployed with each of the braking subassemblies (210A, 210B, 210C) applying different amounts of force (212A, 212B, 212C) to the driving surface (150), with the size of the arrows indicating the amount of force applied. FIG. 3B depicts a related embodiment that includes four braking subassemblies (210A, 210B, 210C, 210D) as seen from below. Note that in some embodiments the surface of the friction device contacting the driving surface can extended across the majority (e.g. greater than 70%) of the width of the vehicle.

Alternatively, a group of braking subassemblies can be arranged as a grid or matrix over the area defined by the underside of the vehicle. In such embodiments all or a portion of the braking subassemblies can be activated on initiation of the emergency braking system. In some embodiments, individual and/or different subgroups of braking subassemblies are activated at different times during an emergency braking process. The timing of this deployment can be controlled by a pre-programmed protocol executed by the onboard computer, or can be modified dynamically in response to sensor data gathered during the emergency braking process (for example, in response to detection of a skid condition, approach of an obstacle, etc.). In such embodiments the downwards force exerted by the friction devices can differ between individual braking subassemblies. In such embodiments individual braking subassemblies can be positioned at different positions on the undercarriage or frame of the motor vehicle (for example, as shown in FIG. 3B and FIG. 10O). Each subassembly can apply varied pressure to each friction device of each braking subassembly. In some embodiments, different amounts of pressure can be applied to different portions of the same friction device (e.g. through different reinforcing plates associated with a single friction device). For example, additional downwards force can be applied to friction devices located towards the rear of the vehicle during an emergency braking procedure. Such differentiation can improve control of the vehicle during braking, for example reducing the probability of the vehicle flipping.

In other embodiments, the friction device can be brought into contact with the driving surface at an angle relative to the driving surface. For example, in such an embodiment the friction device can be contacted with the driving surface at an angle of about 5°, 10°, 15°, 20°, 25°, 30°, 35°, 40°, 45°, 50°, 55°, 60°, 65°, 70°, 75°, 80°, 85°, 90°, or greater than 90° relative to the driving surface during an emergency braking process. Such an angle can effectively increase the force with which the friction device contacts the driving surface and thereby apply additional braking force. In such embodiments the portion of the friction device in contact with the driving surface (e.g. the friction surface) can be flexible and/or pliant. Alternatively, only one or more portions of such a friction surface can be flexible and/or pliant. In some embodiments this contact angle can be varied during an emergency braking process in order to modulate the applied braking force. Examples of such embodiment are shown in FIGS. 4A to 4C, 5A to 5C, and 6A to 6D, which depict an emergency braking system which deploys the friction device to the driving surface at a first angle (for example, about 50°) at T0 (initiation of the emergency braking process), transitions to a second angle (for example, about 0° or parallel) at T1 (midway through the emergency braking process), and in some instances further transitions to a third angle (for example, about −50° at T3 (towards the end of the braking process).

Figure 4A:
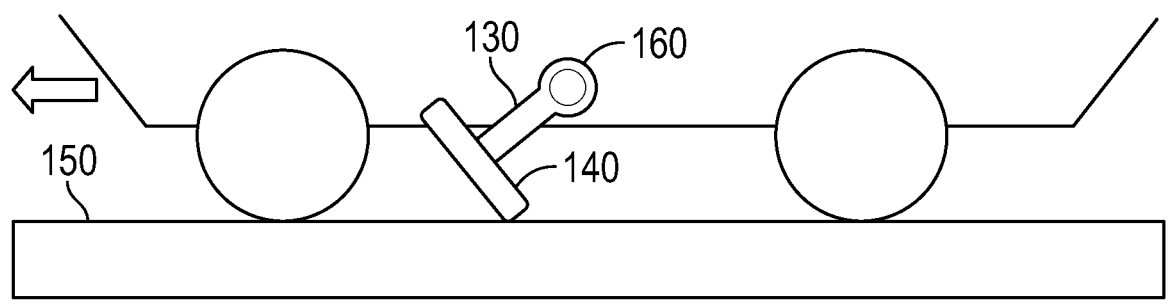
FIG. 4A.
Figure 4B:
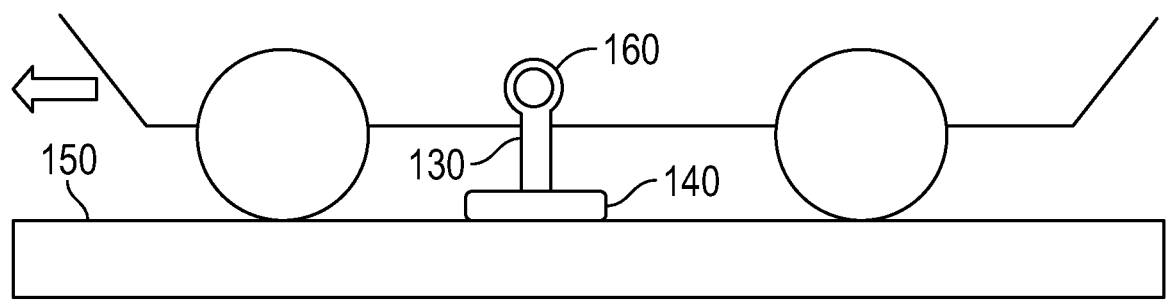
FIG. 4B.
Figure 4C:
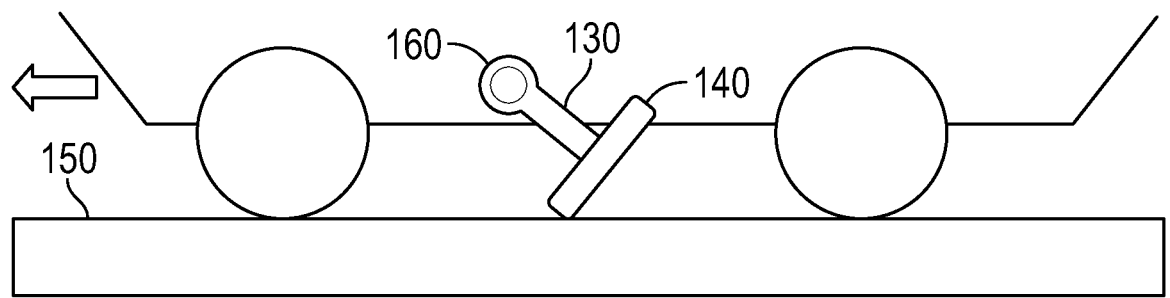
FIG. 4C.

FIGS. 4A to 4C depict a system in which a deployment mechanism 130 is coupled to the vehicle at one terminus using a rotating device (160) (i.e. a device that permits rotation in at least one plane between the coupled objects) and coupled to the friction device (140) at the other terminus. Suitable rotating devices include swivels, axles, gears, and rockers. FIG. 4A shows such a system at the beginning of braking, where the friction device (140) is angled such that a rear portion of the friction device comes into initial contact with the driving surface (150). FIG. 4B depicts a subsequent stage of the braking process, in which the friction device (140) is in a position to apply maximum frictional force to the driving surface (150) by being in an essentially (e.g. within 10°) vertical position. FIG. 4C depicts a further subsequent stage of the braking process in which the braking assembly is positioned such that only the front edge of the frictional device (140) is applied to the driving surface (150). It should be appreciated that adjustment of rotational angle in such embodiments provides a simple and robust mechanism for adjusting the braking power applied during a braking operation.

Figure 5A:
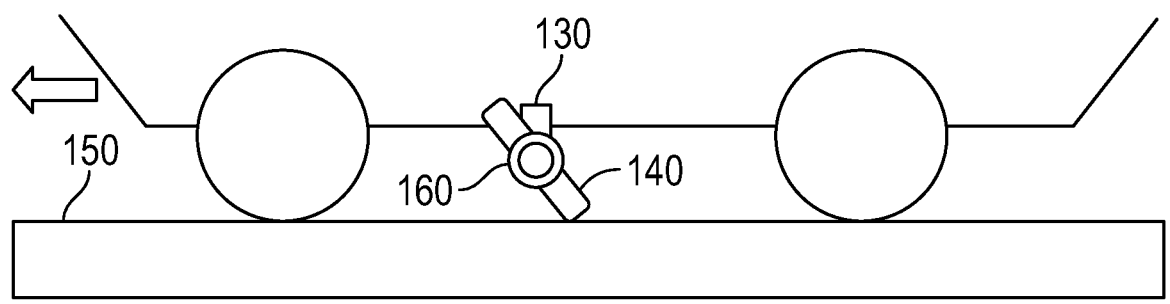
FIG. 5A.
Figure 5B:
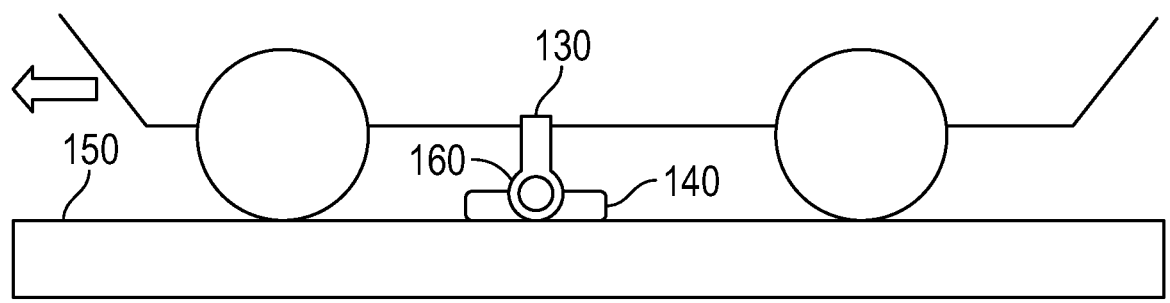
FIG. 5B.
Figure 5C:
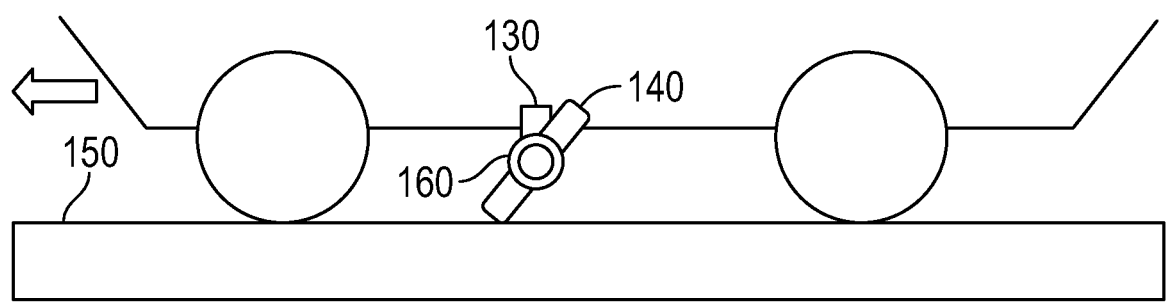
FIG. 5C.

FIGS. 5A to 5C depict an alternative embodiment in which a deployment mechanism (130) is coupled to the vehicle at one terminus and coupled to the friction device (140) at the remaining terminus using a rotating device (160). Suitable rotating devices include swivels, axles, gears, and rockers. FIG. 5A shows such a system at the beginning of braking, where the friction device (140) is angled such that a rear portion of the friction device comes into initial contact with the driving surface (150). FIG. 5B depicts a subsequent stage of the braking process, in which the friction device (140) is in a position to apply maximum frictional force to the driving surface (150) by being in an essentially (e.g. within 10°) vertical position. FIG. 5C depicts a further subsequent stage of the braking process in which the braking assembly is positioned such that only the front edge of the frictional device (140) is applied to the driving surface (150). It should be appreciated that adjustment of rotational angle in such embodiments provides a simple and robust mechanism for adjusting the braking power applied during a braking operation.

Figure 6A:
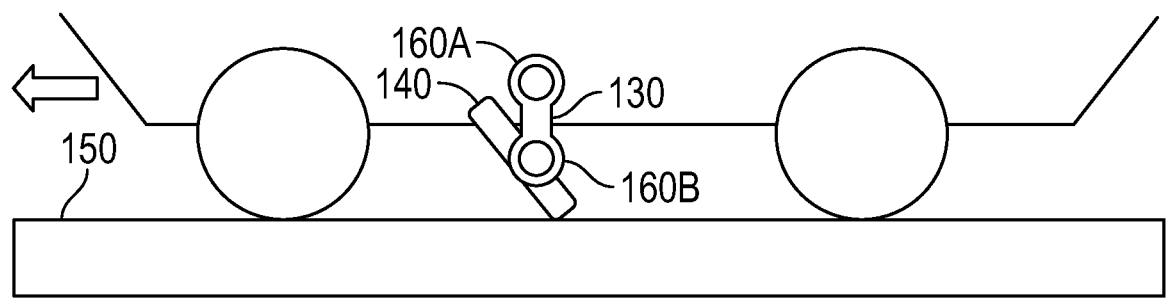
FIG. 6A.
Figure 6B:
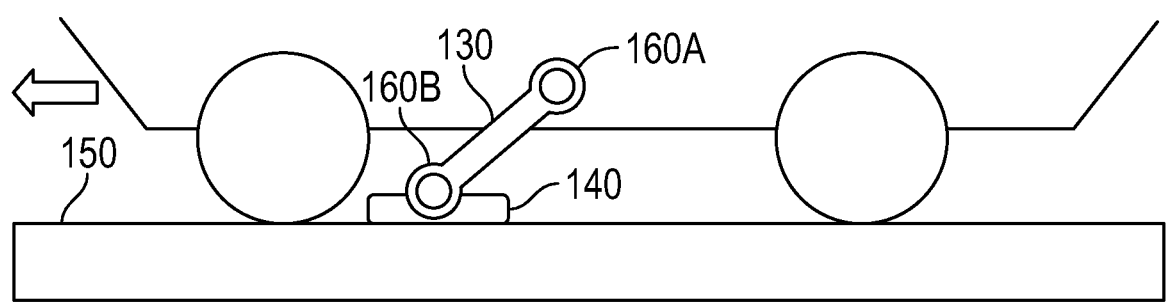
FIG. 6B.
Figure 6C:
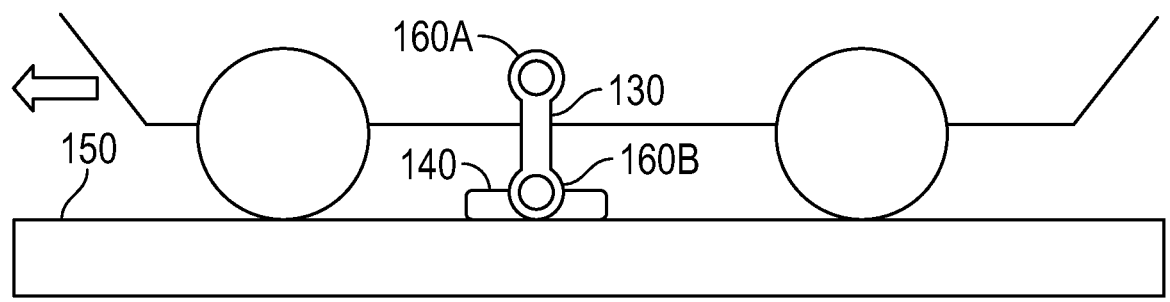
FIG. 6C.
Figure 6D:
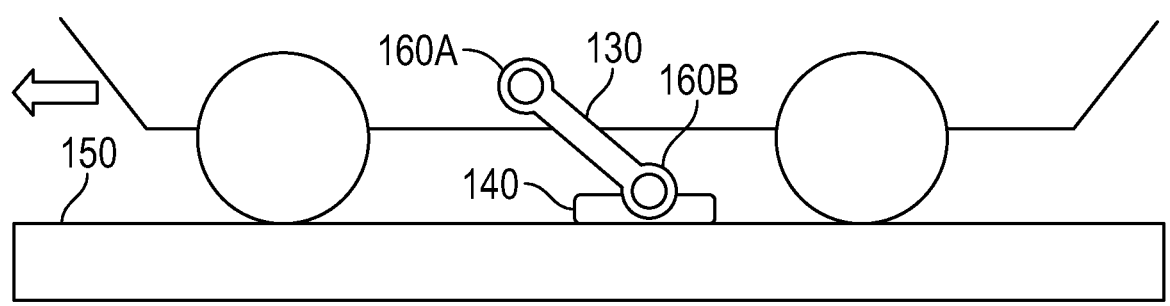
FIG. 6D.

In some embodiments, as shown in FIGS. 4A to 4C and 5A to 5C, the friction device is applied to the driving surface at an angle. In other embodiments, such as shown in FIGS. 6A to 6D, the angle of the friction device can be held constant while the angle of the deployment mechanism is varied over at least part of the braking process. In the system depicted in FIG. 9A, a deployment device (130) is coupled to the vehicle at one terminus using a first rotating device (160A) and to the friction device (140) at a second terminus using a second rotating device (160B). In such embodiments the friction surface can initially be applied at an angle relative to the driving surface (FIG. 6A), or alternatively the friction surface can be applied to the driving surface while essentially parallel to the driving surface (FIG. 6B). This advantageously permits refinement of the emergency braking procedure. For example, initially contacting the driving surface with the friction device at an angle provides increased braking force while initial application of the friction device while essentially (e.g. within 10°) parallel to the driving surface can be advantageous under low friction conditions (such as snow and ice). Although depicted in FIGS. 6B to 6D as being applied essentially parallel to the driving surface, it should be appreciated that the friction device can be applied to the driving surface at any suitable angle in such embodiments. Where FIG. 6A depicts an initial stage of the braking process, FIG. 6C depicts a subsequent stage where the point at which braking force is applied relative to the vehicle is shifted towards the rear axle. FIG. 6D depicts a further subsequent stage of the braking process where braking force is further displaced towards the rear of the vehicle.

In such embodiments the friction device and/or the deployment mechanism can include one or more hinges or pivots that facilitate modification of the contact angle or angle of application of the friction device. In some embodiments such a hinge(s) or pivot(s) (for example a hinge or pivot between the undercarriage and the deployment mechanism and/or a hinge or pivot between the friction device and the deployment mechanism) can include a mechanism that increases its rotational resistance (for example, a gear mechanism, hydraulic mechanism, and/or friction brake) of the hinge(s) or pivot(s). Such increased rotational resistance can increase the braking power of the emergency braking system. Similarly, such hinges or pivots can be coupled to a mechanism (for example, a pneumatic device, a hydraulic device, a solenoid, and/or an electric motor) that actively drives rotation of the hinge or pivot, thereby increasing or decreasing braking force as needed.

Figure 7A:
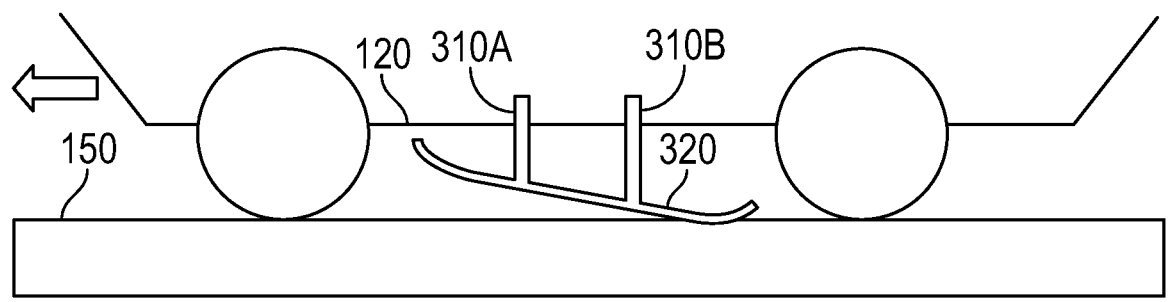
FIG. 7A.
Figure 7B:
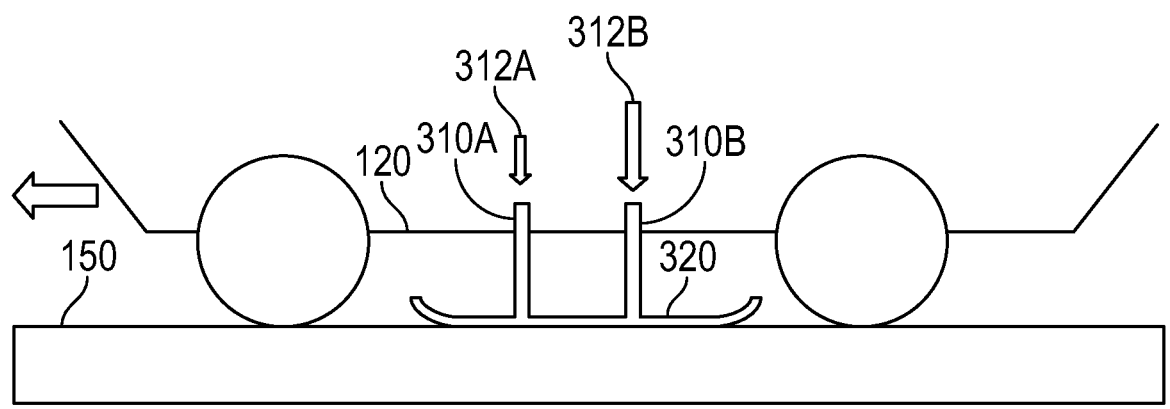
FIG. 7B.

In another embodiment of the inventive concept a friction device of the emergency braking system can be coupled to two or more deployment mechanisms, as shown in FIGS. 7A and 7B. In such embodiments a friction device can be coupled to 2, 3, 4, 5, 6, 7, 8, 9, 10, or more than 10 deployment mechanisms. FIG. 7A depicts an example of such a braking system in which two deployment mechanisms (310A, 310B) are coupled to a single friction device (320). The friction device shown incorporates upwards inflections at its leading and trailing edges, which can serve to deflect loose road debris. It should be appreciated, however, that any of the friction device configurations shown above can be used. FIG. 7A depicts an initial stage of the braking process, in which differential extension of the deployment mechanisms (310A, 310B) places only the rear part of the friction device (320) in contact with the driving surface (150). It should be appreciated that this angle can be adjusted during braking to provide control of the applied braking force. FIG. 7B depicts a related embodiment, in which the force applicators (310A, 310B) are extended to place the friction device (320) in essentially parallel contact with the driving surface (150), and are applying different amounts of downwards force (312A, 312B) to the front and rear portions of the friction device. It should be appreciated that such downward forces can be varied during the braking process to provide control of the applied braking force.

In such embodiments the deployments mechanisms (for example, pneumatic devices, hydraulic devices, solenoids, and/or other linear force applicators) can be extended at different rates in order to control the angle at which the friction device initially (for example, at a T0) contacts the driving surface. For example, a deployment mechanism at a forward position relative to the vehicle's direction of travel can be extended more slowly than a second deployment mechanism coupled to the same friction device in a more rearward position, as shown in FIG. 7A. In some embodiments individual deployments mechanisms of such multiple deployment mechanism sets can apply different amounts of downwards force once the friction device is in contact with the driving surface (for example at a T1). In such embodiments the amount of force applied by individual deployment mechanisms can be controlled to optimize the emergency braking process. For example, as shown in FIG. 7B a more rearward deployment device can apply greater force than a more forward device in order to increase braking force.

In another embodiment of the inventive concept, force resulting from friction between the deployed braking surface and the road surface is transferred to bars, tracks, or rails of the deployment mechanism. Such bars, tracks, and/or rails can be components along which other portions of the emergency braking system that are coupled to a braking surface or pad travel during deployment. It should be appreciated that this is in contrast to systems in which forces generated during braking are transferred from such components directly to the vehicle frame. The device lowers a friction element (for example, a braking surface and/or pad) to the road to create friction with the road and generate a braking force between the driving surface and the vehicle. The braking force can be transferred through support bars that are positioned at an angle relative to the lowered friction element to bear the load of the breaking force, transforming that force back to the car. Such support bars (or portions thereof) can travel along one or more tracks or bars during deployment of the braking system. The friction element can be lowered from a raised position, which can be adjusted in accordance with vehicle type, vehicle type, weather conditions, and or road conditions. The braking power of this device is a function of both the surface area of the pad and the pressure exerted on a friction element by the deployment system. Both of these can be adjusted during braking operation to provide variable degrees of braking power. This is particularly important for variable scenarios where different braking distances are required. The inventor contemplates that devices and systems of the inventive concept can be particularly useful in combination with a vehicle autonomous braking system.

In such embodiments of the inventive concept load bearing or connecting bars can be coupled to one another at a pivot point using a rotatable connection to form a load bearing bar pair. Such a pivot point can be positioned approximately midway along the length of one or both members of a load bearing arm pair, positioning the load bearing arm pair in an "X" configuration. Each load bearing bar of a load bearing bar pair can have an upper segment defined as the portion of the load bearing bar that is between the vehicle and the pivot point, and a lower segment defined as the portion of the load bear bar that is between the pivot point and the friction device of the braking system.

Figure 8A:
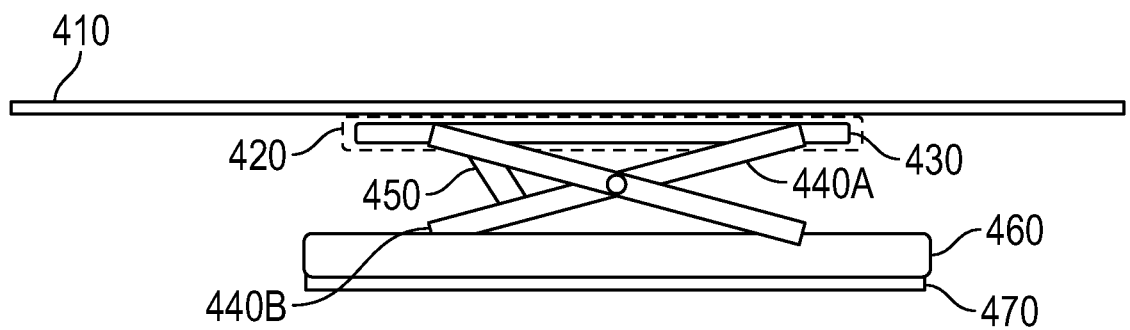
FIGS. 8A and 8B.
Figure 8B:
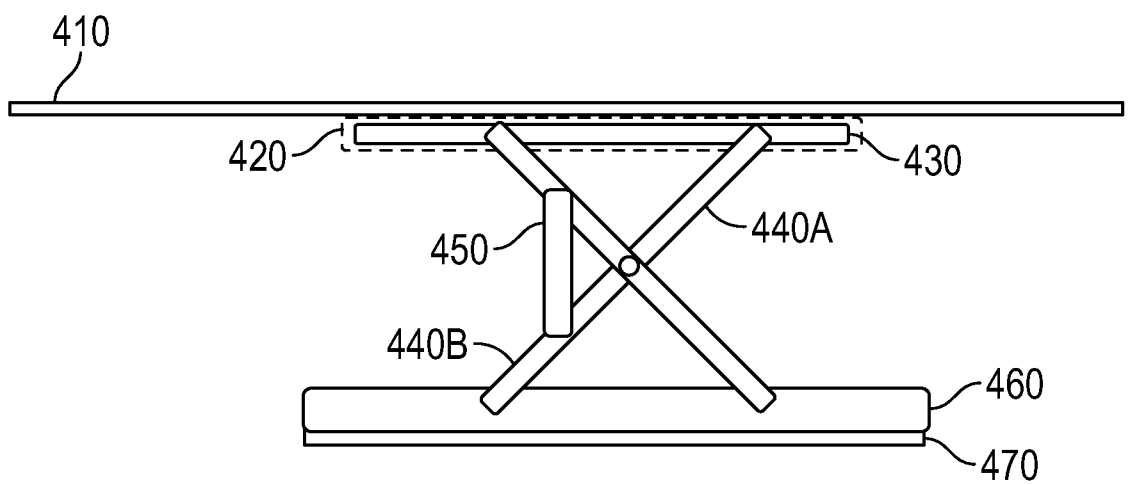

An example of such a braking system is shown in FIGS. 8A and 8B. FIG. 8A depicts a braking system in which a frame (420) is coupled to an undercarriage component (410) of the vehicle. The frame (420) is depicted with a dotted outline to indicate a cutaway view that reveals a channel (430) within or formed by the frame. Load bearing or connecting arms (440A, 440B) are rotatably coupled to one another (for example, at approximately their midpoints) and coupled at their upper termini within the channel (430), and can slide through at least a portion of the channel. The lower termini of the load bearing arms (440A, 440B) are coupled to a friction device that includes a supporting plate (460) that has a friction pad (470) attached to its lower surface. Although depicted as including a supporting plate and friction pad, it should be appreciated that the friction device can have any configuration depicted in FIGS. 1A, 1B, 2A to 2D, 3A, 3B, 4A to 4C, 5A to 5C, 6A to 6D, 7A, and/or 7B. An extendible force applicator (examples of which are provided above) is coupled between the load bearing arms (440A and 440B), such that the force applicator is coupled to the upper segment of one member of a load bearing arm pair and to the lower segment of the other member of the load bearing arm pair. FIG. 8A depicts the braking system in a non-deployed or storage position. As shown, extension of the force applicator results in extension of the friction pad away from the undercarriage of the vehicle. Although shown in an essentially vertical position (i.e. between upper and lower segments of members of a load bearing bar pair), it should be appreciated that the force applicator can be similarly mounted horizontally (i.e. between upper segments of a load bear bar pair and/or between lower segments of a load bearing bar pair). In such an embodiment, extension of the force applicator results in retraction of the friction pad towards the vehicle undercarriage. FIG. 8B depicts the device of FIG. 8A in an extended position. Extension of the force applicator (450) has separated the load bearing arms (440A, 440B) as they slide within the channel (430), impelling the friction pad (470) away from the vehicle undercarriage and towards the driving surface. Such an arrangement advantageously directs braking force derived from friction of the friction pad with the driving surface through the load bearing arms. For example, if the left side of FIG. 8B represents the leading edge of a braking vehicle, braking force through the braking system is primarily received by load bearing arm 440A, and subsequently transferred to the frame 420. This avoids direct application of force to the force applicator (450) during braking, protecting this relatively delicate mechanism. In addition, the frame (420) can be coupled to a variety of structures of the undercarriage of the vehicle, spreading out the braking force.

Suitable deployment mechanisms can include one or more of a pneumatic device, a hydraulic device, a steam force applicator, a motor powered force applicator, a linear motor, and/or a controlled explosive (for example, when coupled with a piston). Such devices apply force to a friction surface and/or pad (e.g. a braking pad), and can be used to lower the braking pad and apply sufficient force to the 'braking pad' to apply a force of between about 300 lbs to about 15,000 lbs (1130 N to 66,700 N) to a driving surface. Such force can be applied during initial impact between the braking pad and the driving surface. A braking pad of the inventive concept can sustain such force against the driving surface for the duration of deployment or, alternatively, only apply such force during initial impact.

In a preferred embodiment of the inventive concept the deployment mechanism provides a sustained force throughout about 50% or more of the time over which the deployment mechanism is extended in order to keep pressure applied to the driving surface through the braking pad from the deployment mechanism. In some embodiments the deployment mechanism can lock (i.e. be fixed in position) once deployed, for example when the pressure applied is enough to keep the pad stationary. Such a deployment mechanism and associated connecting bars can be deployed at an angle, and pressure can be applied at an angle relative to either or both of the braking pad and connecting bars. This pressure can be sufficient to maintain the connection bars and deployment mechanism at this angle though the deployment without an additional locking mechanism. Alternatively no sustained force is applied and a 'locking device' (for example, a ratchet, gear, and/or latching mechanism) can be used to maintain the angle. Such a locking device can be attached to connection bars, a frame, and/or other parts of the deployment mechanism to maintain the position of a deployed braking pad once deployed. In a preferred embodiment of the inventive concept the deployment mechanism can include a driving force applicator in the form of a double acting (e.g. having two drivers) pneumatic or hydraulic device that lowers the braking pad on extension. The same double acting pneumatic device can also raise a braking pad on retracting.

Figure 11A:
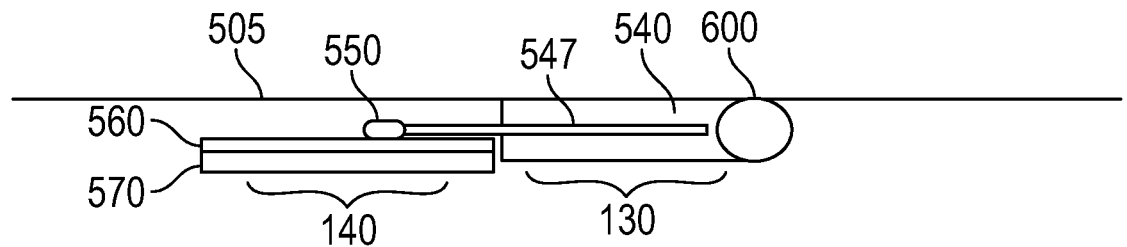
FIGS. 11A to 11D depict an alternative embodiment of a braking system of the inventive concept in which a rotating device is provided that acts in concert with a force applicator.
Figure 11B:
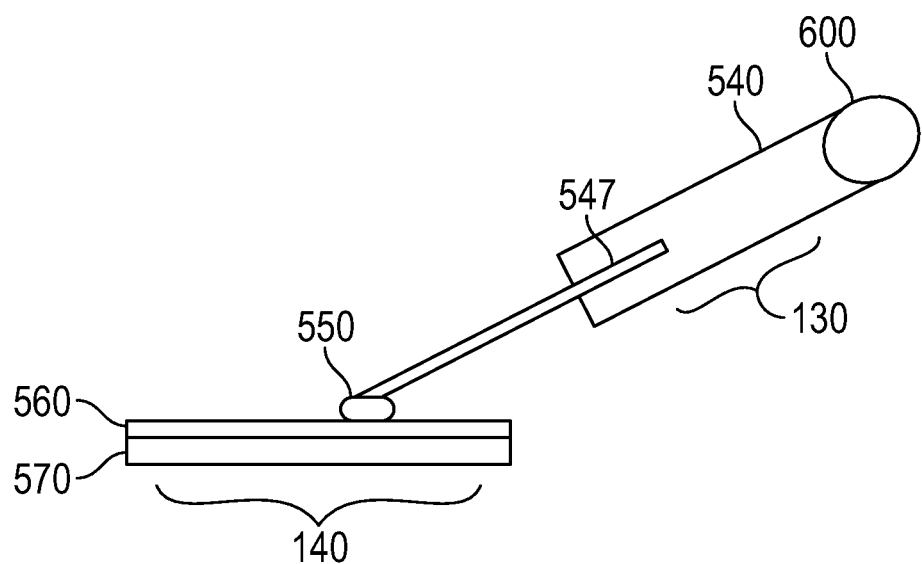
Figure 11C:
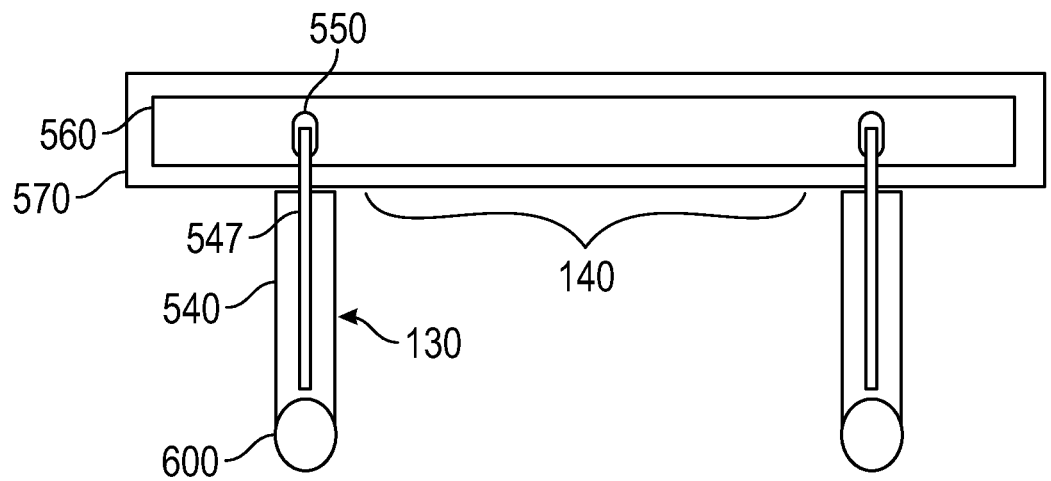
Figure 11D:
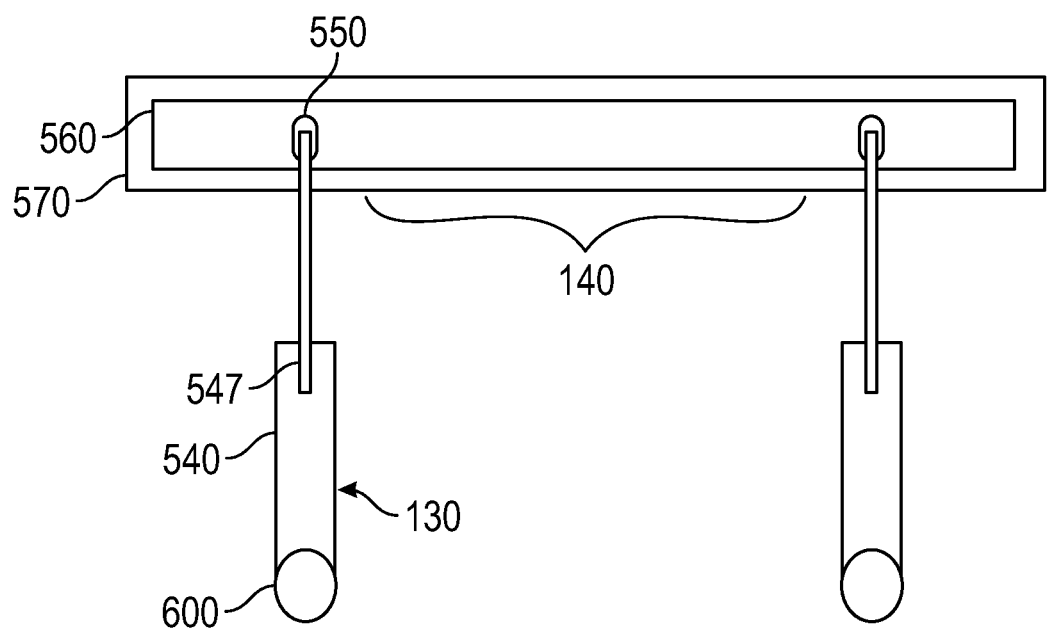

In an alternative embodiments depicted in FIGS. 11A, 11B, 11C, and 11D, the deployment mechanism can include a primary rotating piece (600) which is attached to the frame or undercarriage of the vehicle, and is positioned to receive force from the deployed friction element (140). FIG. 11A provides a side view of such a braking device in the retracted configuration. FIG. 11B provides a side view of the corresponding device in an extended configuration. Such primary rotating piece (600) can swivel and/or rotate along one or more axes relative to the friction element (140), thereby directing it to make contact with the driving surface. The primary rotating piece (600) can apply mechanical force to the friction element through its rotation, providing a supplementary downward force in addition to force provided by the force applicator (540). In such an embodiment, the force applicator (540) can rotate and change position from a starting position which is parallel in relation to the undercharge of the vehicle, to a deployed position at an angle of between 90° to 10° degrees in relative to the undercarriage or frame of the vehicle. Such embodiments can include features corresponding to those of embodiments described above, such as reinforcing plate (560), friction surface (570), undercarriage (505), force applicator (540), force applicator rod (547), and/or pivoting connector (550). Additional support bars can be connected between the friction element and vehicle undercharge or portions of the frame of the braking device. Such secondary support bars can also rotate and change position to bear load and receive force from the deployed friction element. Such a secondary support bar can also have a retracted and extended configuration.

Figure 9:
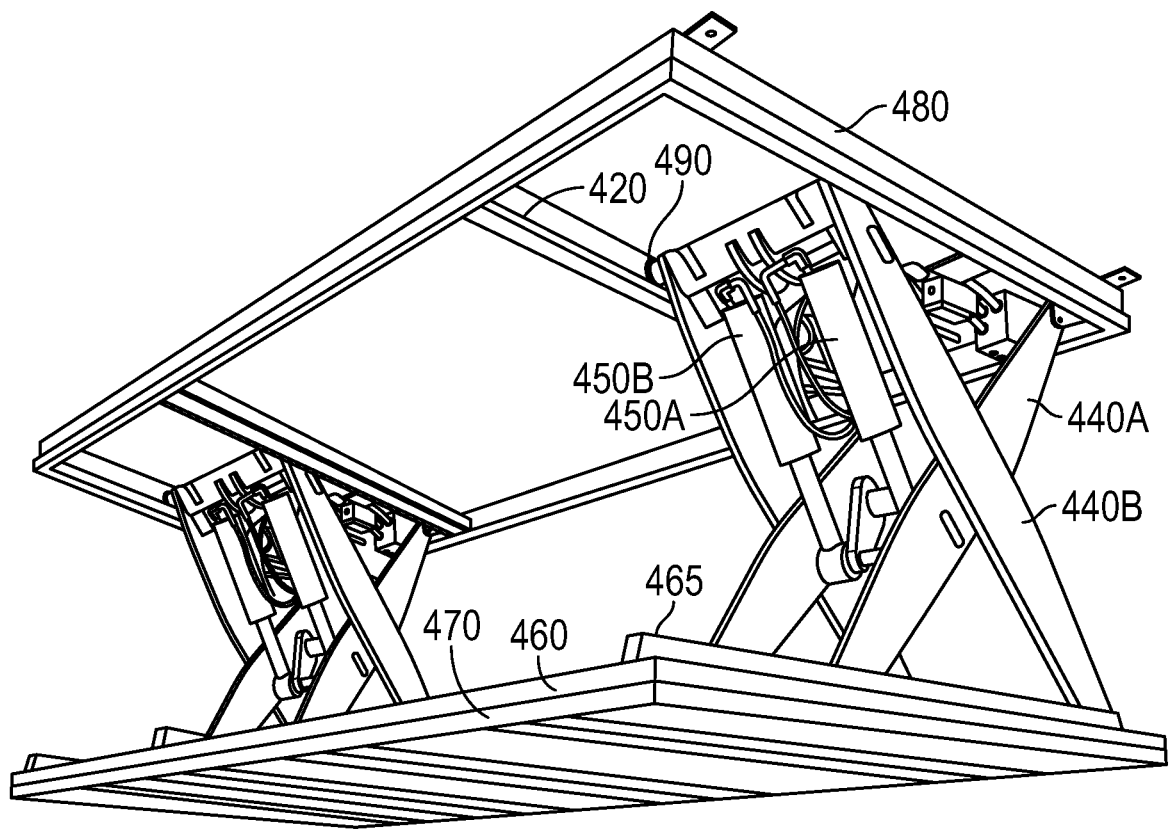
FIG. 9.

In some embodiments of the inventive concept a braking system as depicted in FIGS. 8A, 8B, and 9 can include a biasing member, which can serve to retract the friction device from the driving surface or to assist in such operations. Such a biasing member can provide a retracting bias (for example, a coiled spring that retracts on release of tension) or an extending bias (for example, a hydraulic or pneumatic strut that extends on release of a compressive force). Such a biasing member can be arranged mounted similarly to a force applicator of the braking system. For example, a retracting biasing member can be coupled to a load bearing bar pair in a fashion similar to an associated force applicator and provide an opposing force that can be used impel the braking system to a closed or resting position. Alternatively, a biasing member can be coupled to a load bearing arm pair in opposition to an associated force applicator. For example in a system where a force applicator is coupled between an upper segment of a first load bearing bar and a lower segment of a second load bearing bar of a load bearing bar pair, an extending biasing member can be coupled between the upper segment of the second load bearing bar and the lower segment of the first load bearing bar. In such an arrangement extension of the force applicator results in compression of the biasing member. When the force applicator is not in action (e.g. at the end of a braking procedure) the biasing member can extend and reverse the movement provided by extension of the force applicator. Similar arrangements are contemplated for braking systems having essentially horizontal (i.e. between upper segments and/or between lower segments of load bearing bar pairs) positioning of the force applicator.

Another example of a braking device of the inventive concept is shown in FIG. 9. As shown, the device utilizes a pair of load bearing arm subassemblies. Such a braking system can include a track (420) that is coupled to a frame (480) and includes a channel or similar feature for coupling with the upper termini of load bearing arms (440A, 440B) such that they can slide within at least a portion of the track. The frame (480) is coupled to the underside of the vehicle. The track (420) can include a stopping feature or locking mechanism (490) that limits or stops movement of the load bearing arms. The lower termini of the load bearing arms (440A, 440B) are coupled to a friction device that includes a reinforcing plate (460) and a friction surface (470) attached to the lower surface of the reinforcing plate. A pair of force applicators (450A, 450B) are coupled between the load bearing arms (440A, 440B), and impel the friction surface away from the underside of the vehicle when extended. Although a pair of force applicators is shown for each load bearing arm subassembly, it should be appreciated that a single force applicator can also be used.

The deployed position of the braking pad can be to a forward extended position (extended toward the front of the vehicle) or backward extended position (extended toward the rear of the vehicle) relative to a starting position in relation to the vehicle frame. Alternatively, a braking pad can be lower essentially vertically and be essentially (i.e. within 10°) aligned relative to its starting position relative to the vehicle frame.

The structure of the connection bars, which act as load bearing bars, can be optimized for the position of the pad once deployed. Such connection bars can have an angled shape, concave shape, curved slope, triangular shape, or other shape, etc., to effectively receive the braking force load when deployed. The load bearing bars can beat an angle relative to the braking force load once deployed. For example load bearing bars at and angle of between about 0° and about 90°, or between about 90° and about 180° in relation to the plane of the road when deployed. This angle can allow the bars to effectively absorb more braking force from the braking. This advantageously allows reduction of the profile of the braking system when in its raised or retracted position. Multiple connection bars or driving force applicators (e.g. 2, 4, 6, 10, etc.) can be deployed across a braking pad in either direction in parallel or not in parallel to better carry the load of the bars. In such embodiments different connection bars can have different angles or positions relative to one another when deployed. The same material can be used for construction of the connection bars, frame, and upper portion of the friction element. Alternatively the connection bars can be made of a stronger material than the other two components to accommodate the need to bear the majority of the load. Suitable materials include steel, aluminum, magnesium, titanium, carbon fiber, and/or composite materials. The material used for the connection bars can be hollow and/or partially hollow (e.g. having an internal lattice or truss structure) to minimize weight while maintaining structural strength. In some embodiments a truss structure of connection bars can be used to bear the load from the braking pad when deployed.

In some embodiments of the inventive concept connection bars (i.e. load bearing bars) can be movably coupled to one or more track(s) (i.e. a load bearing bars track) within the frame of the braking system such that the connection bars can slide along such a load bearing bars track when deployed, for example when changing the position of the pad and/or lowering the pad. In a preferred embodiment of the inventive concept a load bearing bars track includes a channel, and a terminus of a load bearing bar engages the channel in the assembled braking system. In a preferred embodiment connecting bars are at or near the end of the load bearing bars track when the braking pad is in its deployed position. The load bearing bars track can be further reinforced on the exterior of the track to accommodate the load of the braking force, which is transferred from the load bearing connection bars to the load bearing bars track.

The position of the connection bars within the load bearing bars track can be adjusted or set during installation of the braking system to adjust the distance over which the braking pad is lowered. Such a load bearing bars track can include one or more stopping point(s) that prevent or resist further movement of the connection bars along the track. The load bearing bars track can be additionally reinforced at such a stopping point. Such a stopping point can be a projection into a channel of the load bearing bar track, such as a constriction of the channel or a catch, rod, and/or bearing that is at least partially positioned within the channel. Alternatively, such a channel can include apertures, slots, and/or other openings that are configured to engage features of the connection bars.

In some embodiments one or more bore hole(s) is(are) created within the load bearing bar track when the braking system is installed, where the bore hole(s) is(are) positioned at a desired stopping position(s) along the load bearing bar track. In such an embodiment a connection bar engaged with the load bearing bar track can only travel that certain distance to the bore hole, thereafter engaging and locking into the bore hole, such that the braking pad is lowered to the desired. In such an embodiment the connection bar can have an engaging feature (for example, a pin) fitted to the portion of the connection bar that is engaged within the load bearing track. Such an engaging feature can be impelled to extend across the load bearing bar track (for example, by a mechanical or electrical action (e.g. spring, etc.)) in order to engage a bore hole, locking the bars in position. A load bearing bar track can be positioned on both sides of a connection bar, providing a pair of bore holes positioned to engage engaging features of the connection bar. Such a connection bar can include a double sided locking pin that engages (for example, by at least partially passing through) the two bore holes on both load bearing bar tracks on either side of the bar. A mechanical action can be utilized to release such locking pins in order to raise the braking pad.

It should be apparent that such features support functions that permit adjustment of the distance that the connection bars travel along the load bearing bar track. In doing so they permit adjustment of the distance that the braking pad is extended during braking. This can be particularly useful for installation on vehicles of different heights as it permits adjustment of the distance that the pad travels between the road and underside of the vehicle. Alternatively, only the deployment force applicator can be engaged with the load bearing connector track and the load bearing bars are attached to robust fixed mechanism that changes the direction of the load bearing bars. In another embodiment neither of the load bearing bars or deployment force applicator is engaged with a track system, but both are engaged with a fixed mechanism that changes the direction of both.

A braking system of the inventive concept includes at least one connection bar that bears the force of the braking load on the pad. In some embodiments a force applicator used to provide motive power for the braking system can serve this function. In such an embodiment the force applicator mechanism can be reinforced (for example, with additional support bars or strengthening wraps). The connection bar that carry the braking load can also be reinforced and can have truss designs to better carry the load.

Figure 10A:
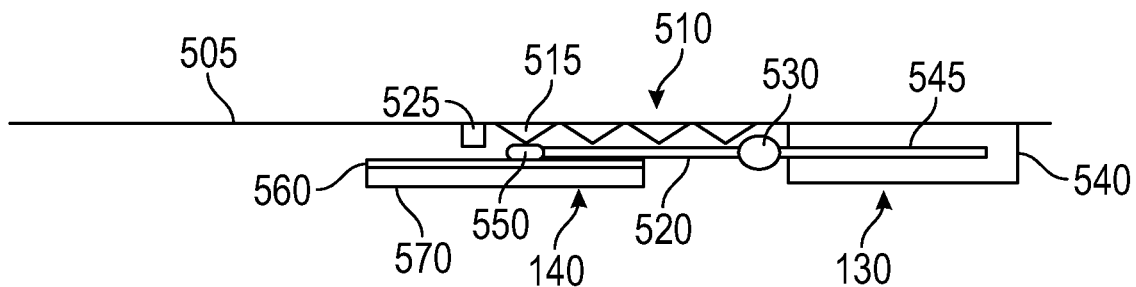
FIGS. 10A to 10G depict an alternative embodiment of a braking system of the inventive concept.
Figure 10B:
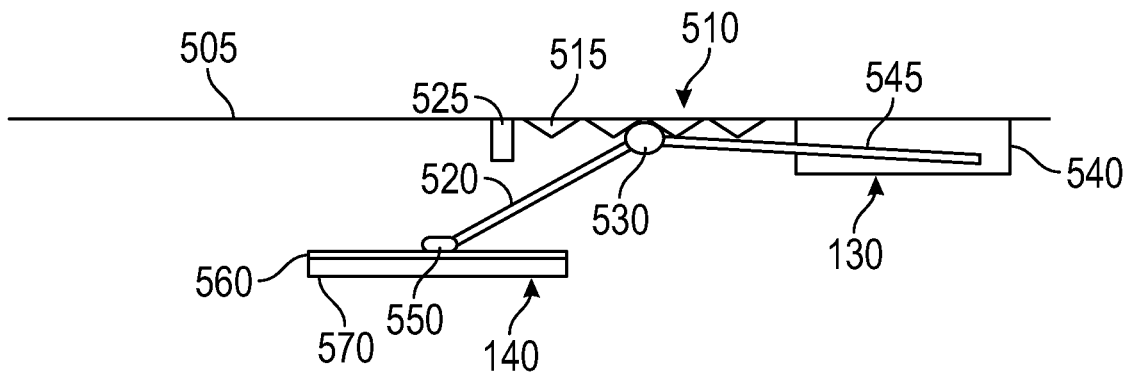
Figure 10C:
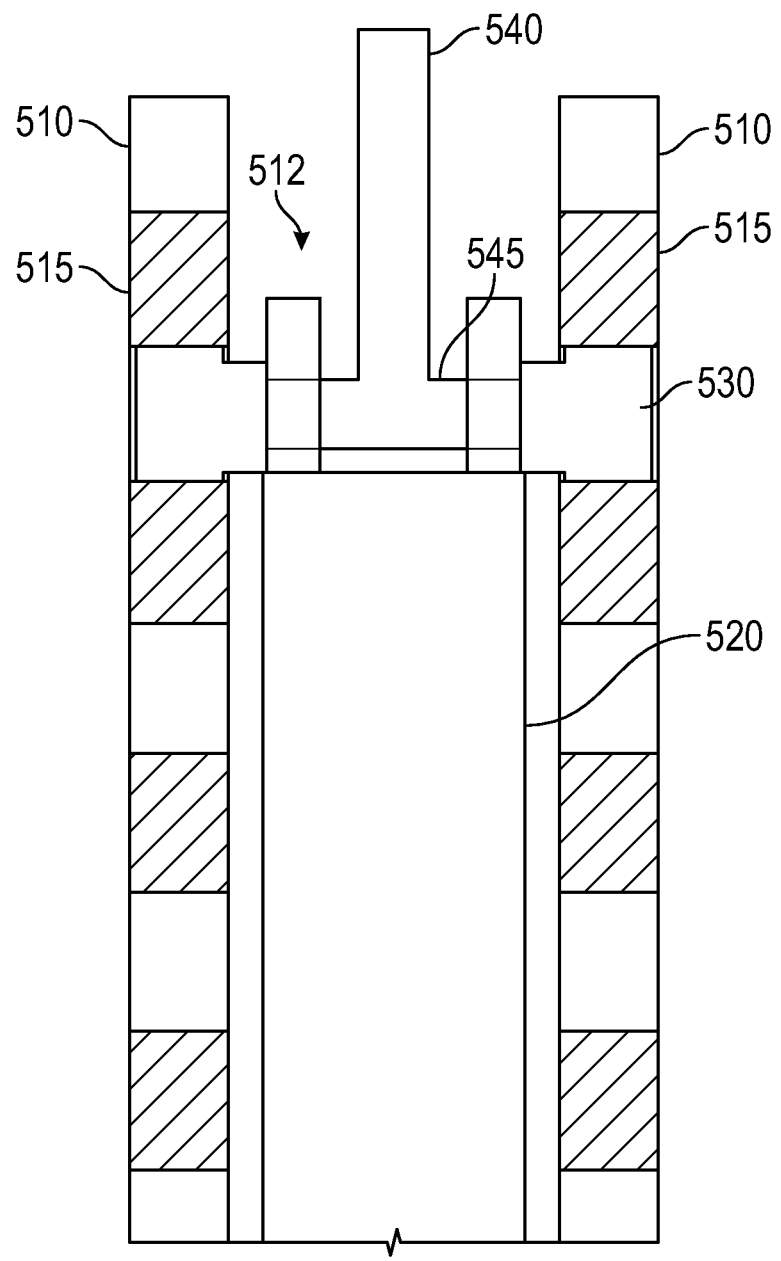

An alternative embodiment of a braking system of the inventive concept is shown in FIGS. 10A to 10C, in which the friction device is moved towards the driving surface by a pivoting or rotating length bar. As shown in FIG. 10A (which shows the system in a withdrawn or retracted position), one or more track(s) (510) can be attached, either directly or indirectly (e.g. via a frame) to the undercarriage (505), undercarriage components, and or frame of a motor vehicle. Such a track 510 can include a central channel that is open towards the driving surface, and can include one or more stopping feature(s) (515) arranged along its length. In a preferred embodiment, two such tracks arranged in parallel are provided. A pivoting or rotating length bar 520 includes a length bar connector (530) at one terminus that engages the track (510), and can be configured to move over stopping features (515) (e.g. by rolling, sliding, etc.) when impelled one direction and be retained in the space between them when impelled in the other direction along the track (510). In some embodiments the stopping features (515) have an asymmetrical shape (for example, a wedge, concave/convex, and/or curved profile) that facilitates movement of the length bar connector (515) along the track in one direction (e.g. during transition to the extended position) while impeding such movement in the opposing direction (e.g. when the friction device is in contact with the driving surface). In some embodiments the stopping features (515) can be arranged and/or configured such that they do not impede movement of the length bar when the friction device is not in contact with the driving surface (e.g. during retraction of the friction element on returning to the retracted position after a braking procedure). For example, one or more of the stopping features can be retractable, so as to permit partial or complete removal from the travel path of the length bar when necessary. The length bar (520) can also include a pivoting connector (550) that is coupled to a friction device that can include a reinforcing plate (560) and a friction surface (570). In some embodiments, the length bar can include multiple pivoting connectors that serve to distribute the applied braking force across the friction device. An example of such an embodiment is shown in FIG. 10L. Alternatively, the friction device can be a monolithic body. In such embodiments the friction device can be connected, either directly or indirectly, to the undercarriage of the vehicle and/or vehicle frame by a friction device support (580). Such a system also includes a force applicator (540) which engages the length bar (520) when the system is activated. Suitable force applicators include a pneumatic cylinder, hydraulic cylinder, liner motor, and/or explosive or pyrotechnic device. As noted above, FIG. 10A depicts the system in closed or retracted position, with the upper surface of the friction device in close proximity (e.g. from about 1 inch to about 4 inches or about 2.5 cm to about 10 cm) to the vehicle frame and/or undercarriage. In such a retracted position the angle between the track (510) and the length bar (520) can range from about 0° to about 30° or more (e.g.

about 0°, 2.5°, 5°, 10°, 15°, 20°, 25°, 30°, 35°, 40°, and/or 45°), depending upon the dimensions of the length bar and the desired distance of the friction device from the vehicle frame and/or undercarriage.

FIG. 10B depicts the system of FIG. 10A in an extended or lowered position, following activation of the system and extension of the force applicator 540. Extension of the force applicator (540) impels the length bar (520) along the channel of the track (510), increasing the angle between the length bar (520) and the track (510) and impelling the friction device towards the driving surface through rotation of the pivoting connector (550). It should be appreciated that in such embodiments braking force is transmitted through the length arm (520) to the track (510), particularly in embodiments in which the stopping features (515) are configured to resist backwards (e.g. in the direction opposing that provided by extension of the force applicator) of the length bar (520). This advantageously reduces mechanical stress applied to the force applicator. In such embodiments the angle between the length rod (520) and the track (510) can increase over the minimum angle noted above for the system in retracted position by from about 2.5° to about 90°, depending upon the dimensions of the length bar (520) and the desired distance of the friction device from the vehicle frame or undercarriage. Such an arrangement advantageously provides a great deal of flexibility in configuring the braking system for different motor vehicles, as both dimensions of the length arm (520) and position along the track (510) can be selected and/or adjusted to provide a broad range of distances that the friction device moves during deployment. In some embodiments of the inventive concept, two or more length bars can be utilized, for example one length bar in each of a pair of tracks. In such embodiments a single force applicator can be used to drive the two or more length bars. Alternatively, each length bar can be actuated by a single force applicator. In still other embodiments, two or more force applicators can be utilized to drive a single length bar.

FIG. 10C depicts an enlarged view of an exemplary interface between the force applicator 540 and the length arm 520 in a system as shown in FIG. 10A. As shown from beneath, the track (510) includes an open, downwards facing channel (512), with a number of stopping features (515) arranged on either side of the channel. The length bar (520), terminal portions of which are shown partially transparent, includes a length bar connector (530) that can occupy the space between adjacent stopping features (515). The force applicator (540) includes a length bar interface (545) that engages the track-engaged terminus of the length bar (520), permitting it to translate the length bar connector (530) along the track (510) on extension of the force applicator. Portions of the length bar interface (545) can be seen lying within the length bar connector (530). A force applicator (540) can include a force applicator rod (547) which can swivel or rotate within the force applicator (540) such that when it is extended the angle of the length bar interface (545) and force applicator rod (547) may be different than when in the retracted position. Such rotation may facilitate the locking of length bar connector (530) within stopping features (515) in the extended position. Such a force applicator rod (547) can include a rod that transfers force from the force applicator (540) to the length bar interface (545), and is contained within the force applicator (540) in a retracted position, and further extending from the force applicator (540) in the extended position. In some embodiments one or more bearings (for example, ball bearings) can be provided to reduce friction between the length bar connector (530) and the length bar interface (545) when the system is actuated. It should be appreciated that the stopping features (515) can serve to reduce mechanical stress on such bearing during operation of the braking system.

In some embodiments of the inventive concept as shown in FIG. 10A to 10C, the braking system can include a length bar piston, which can extend between the frame and/or undercarriage of the vehicle and the length bar. Such a length bar piston (525), can have a retracted and deployed position and can be positioned above length bar (520) and/or above stopping features (515), and the track (510) to engage length bars (520) when extended (e.g. to transition to the deployed position) such that the piston makes contact with one or more length bars, driving the bars towards the driving surface to begin rotation of the bar such that it rotates before making contact with the driving surface. Length bar piston (525) can be positioned to engage through a portion of the track (510) and stopping features (515). Additionally there may be multiple length bar pistons (525) to engage length bar (520) at the same time. Length bar piston may retract when deployment mechanism is retracted. Length bar piston (525) may be triggered by an onboard computer and/or may be triggered in synchronization to the deployment of the deployment mechanism.

Figure 10D:
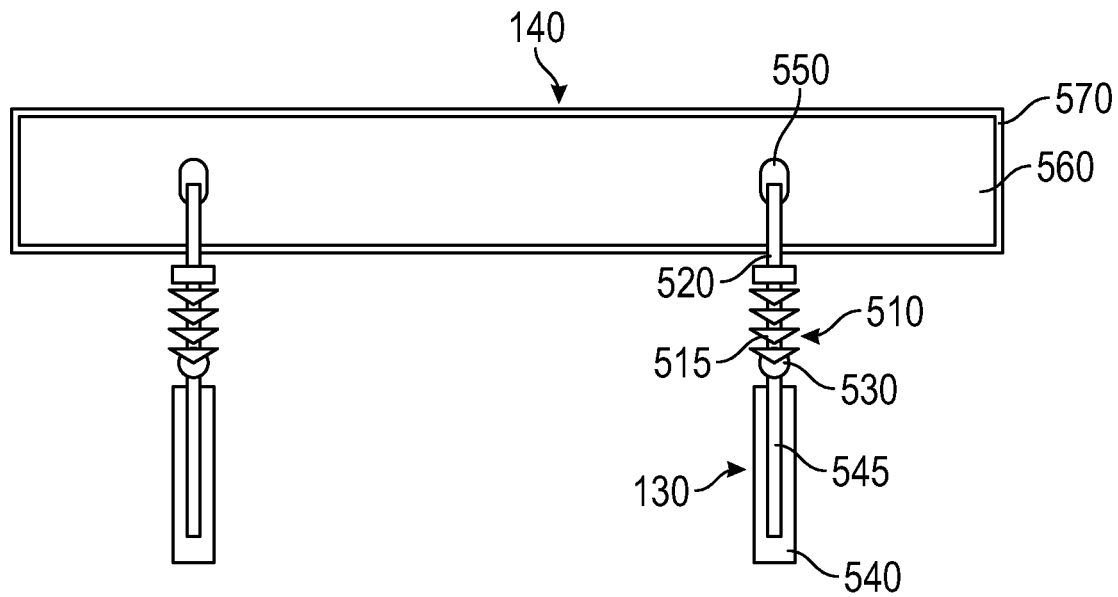
Figure 10E:
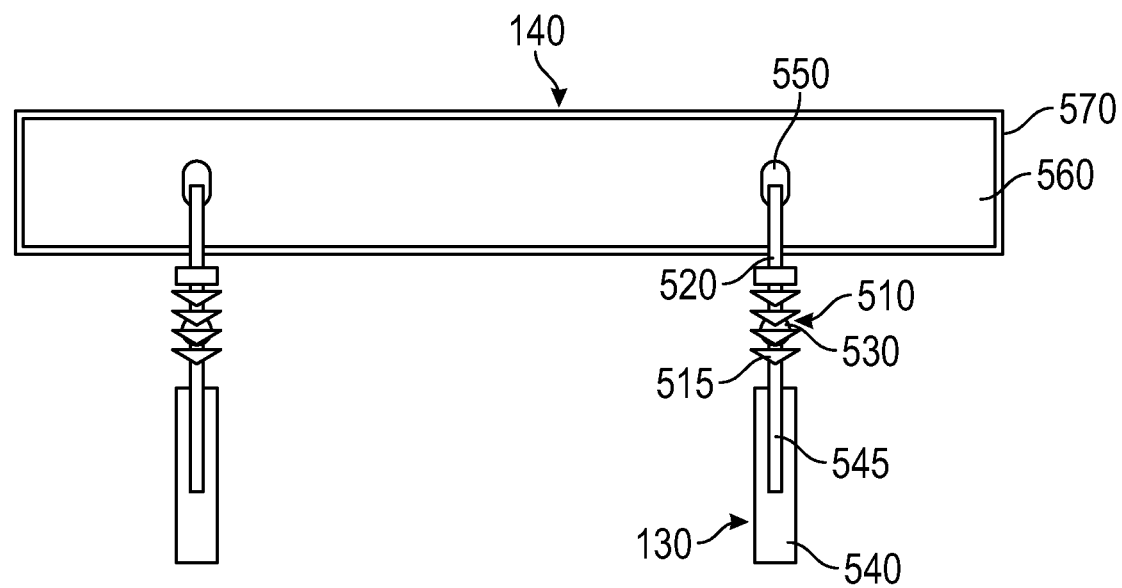
Figure 10F:
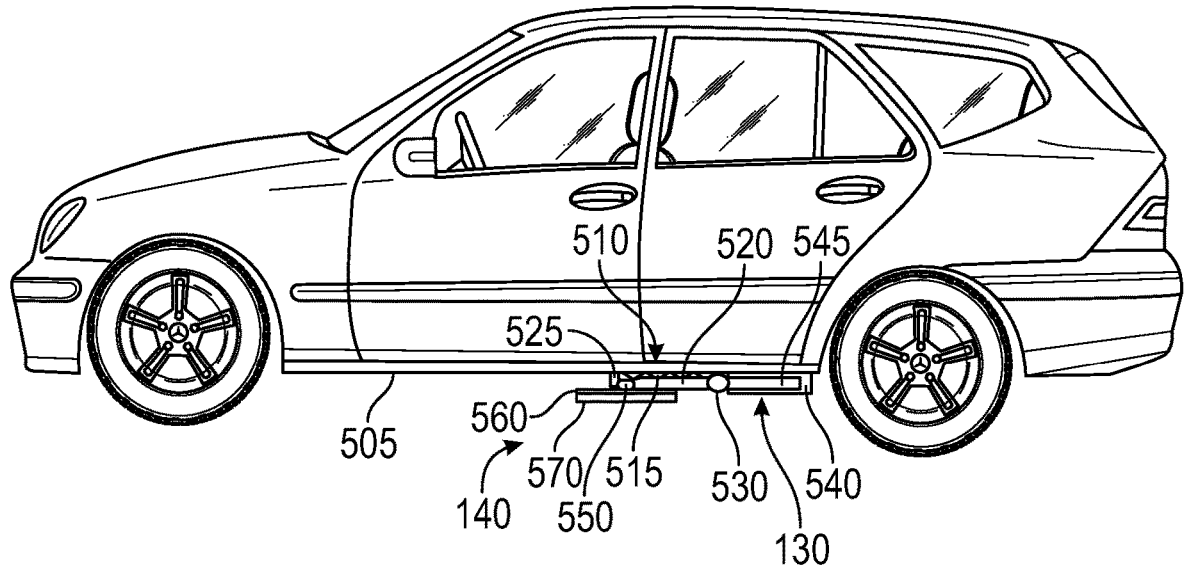
Figure 10G:
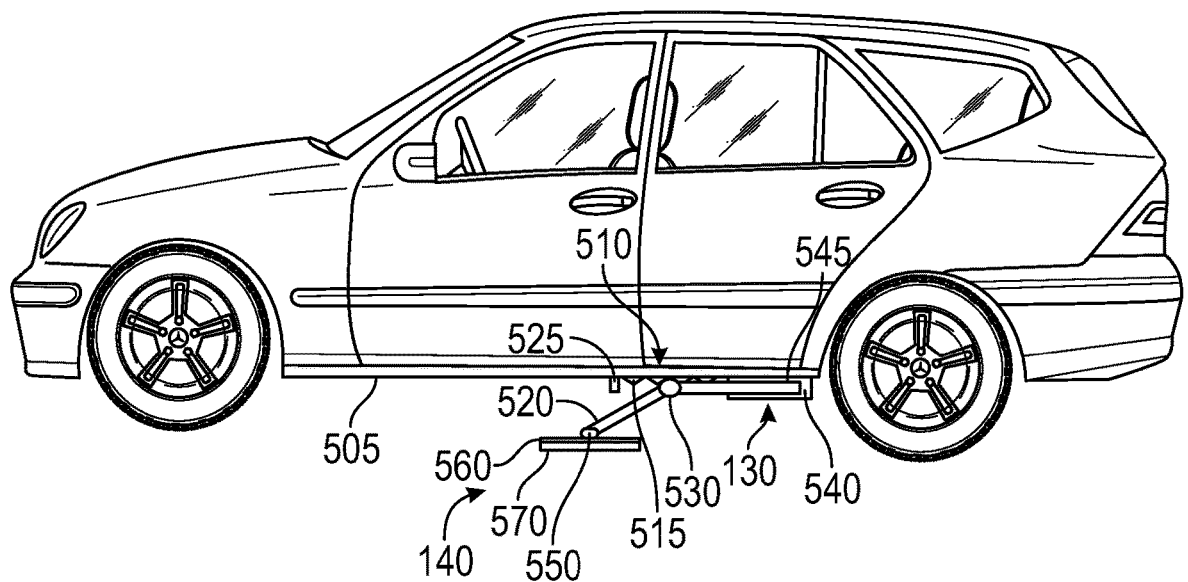
Figure 10H:
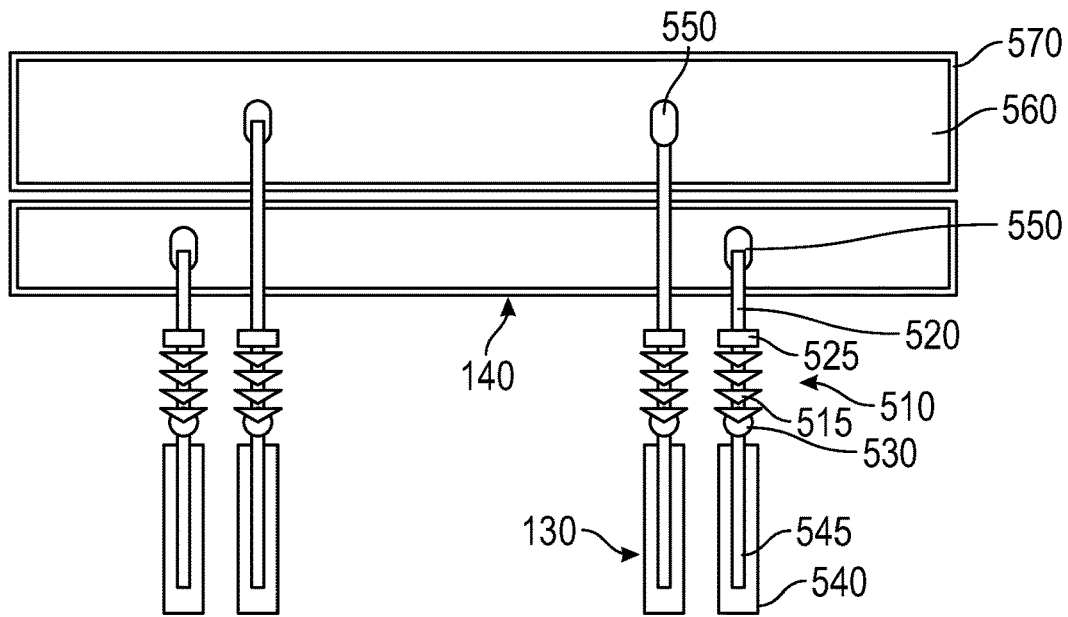
FIGS. 10H to 10K depict alternative embodiments of a braking system of the inventive concept that include two or more friction devices.
Figure 10I:
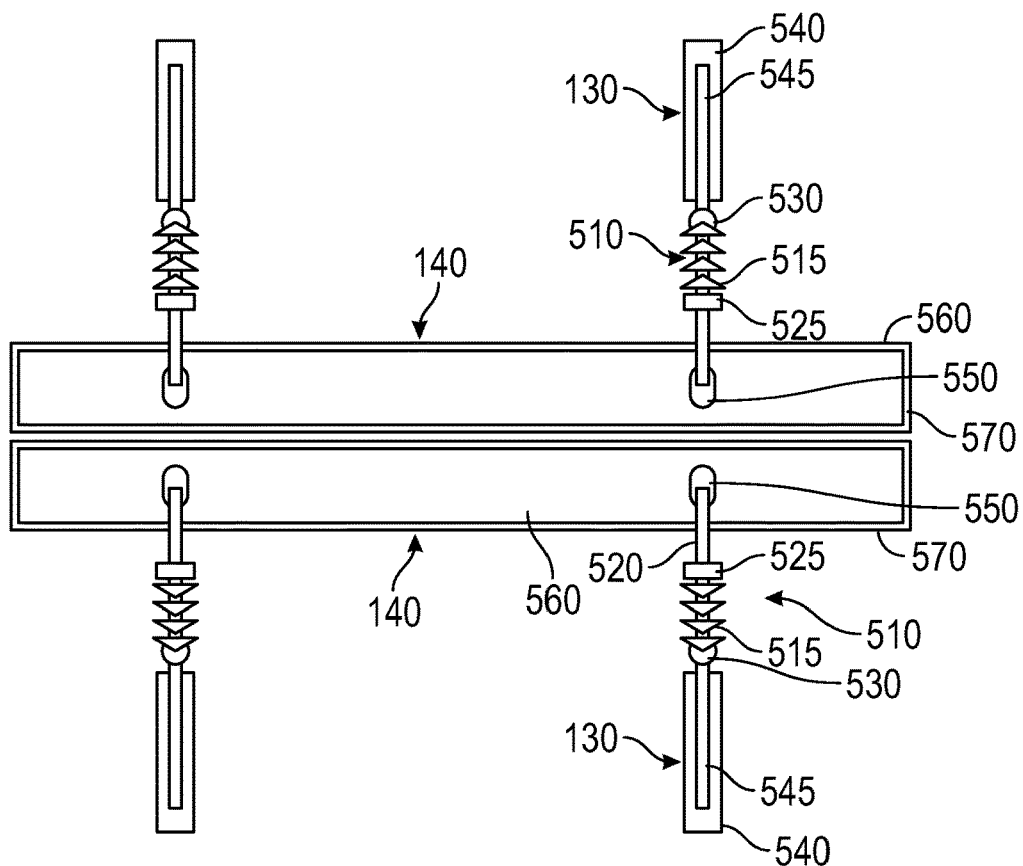
Figure 10J:
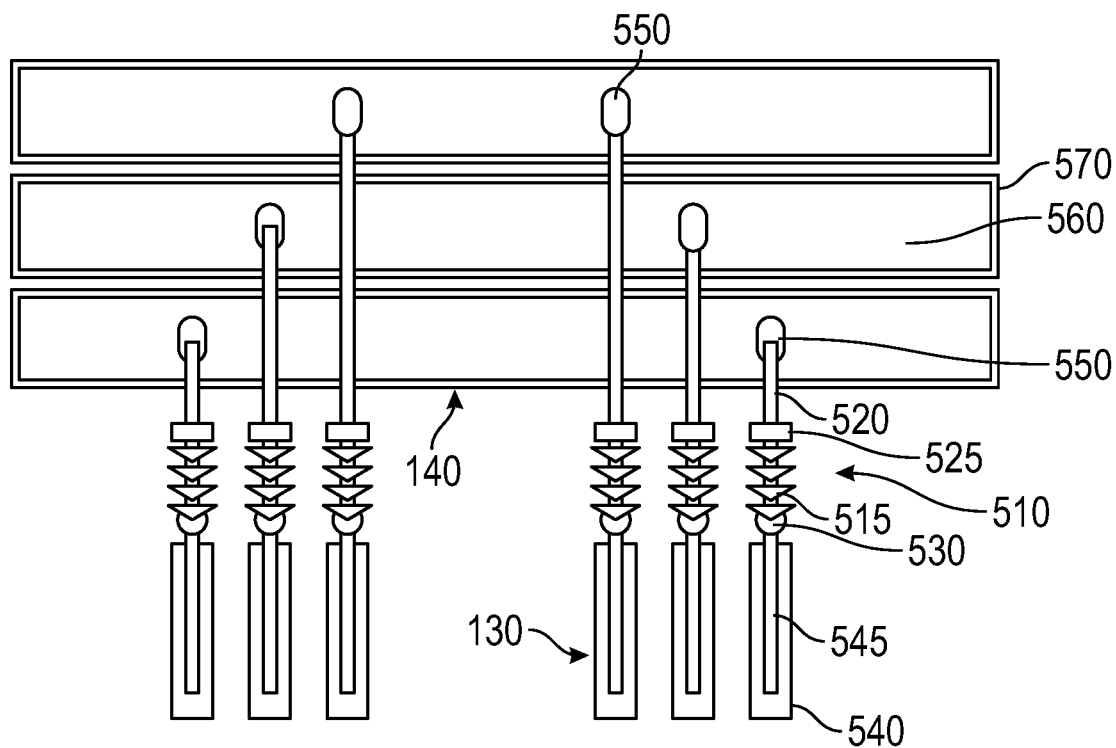
Figure 10K:
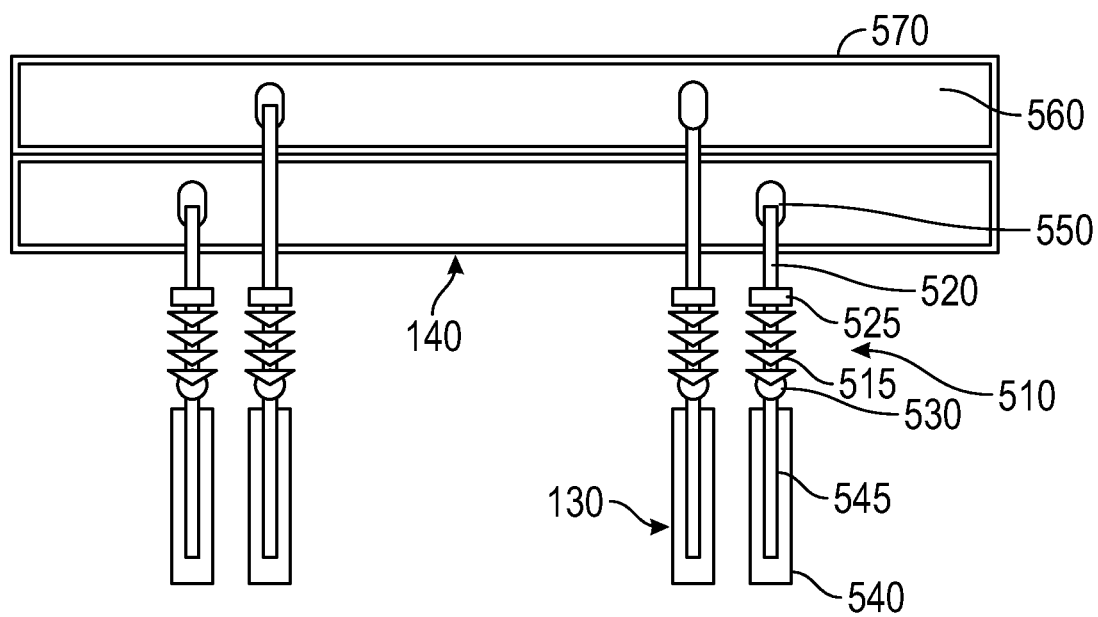
Figure 10L:
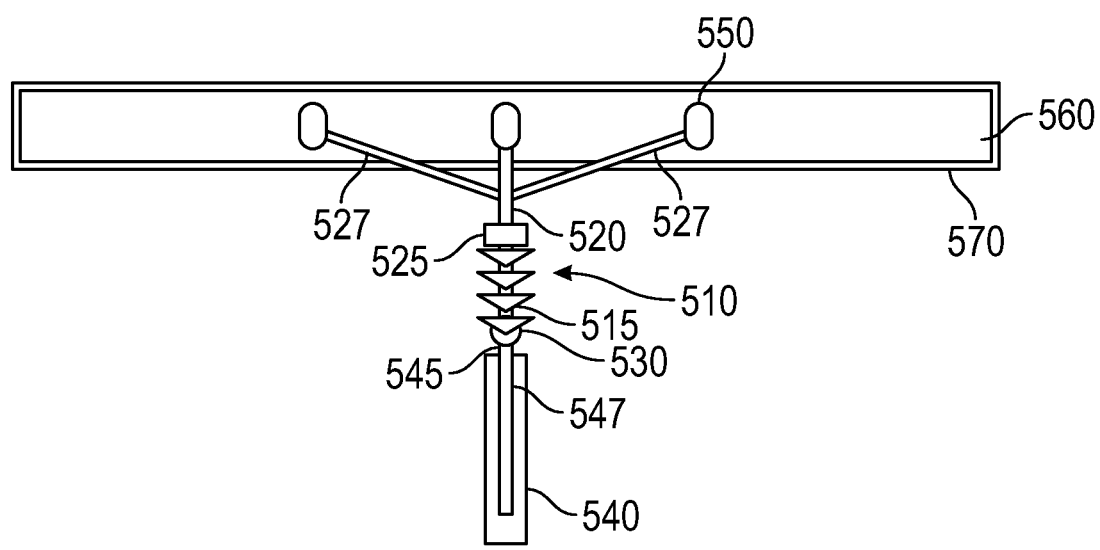
FIG. 10L depicts an embodiment of a braking system of the inventive concept in which a single length arm is provided with multiple pivoting attachments to a single friction device.
Figure 10M:
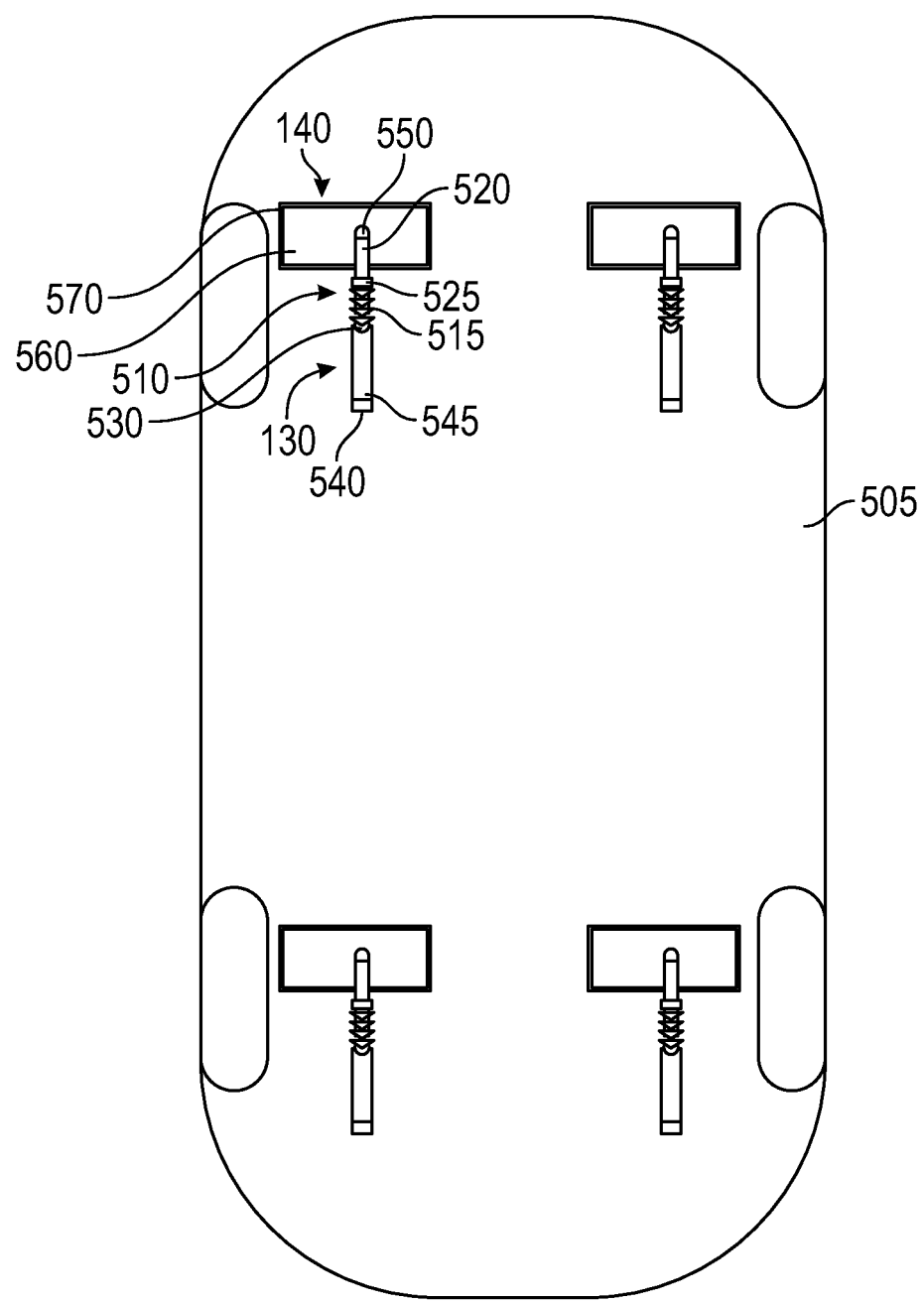
FIG. 10M depicts an embodiment of a braking system of the inventive concept that includes four braking subassemblies distributed as a grid across the underside of the motor vehicle. As shown, each subassembly is associated with a wheel of the motor vehicle.
Figure 10N:
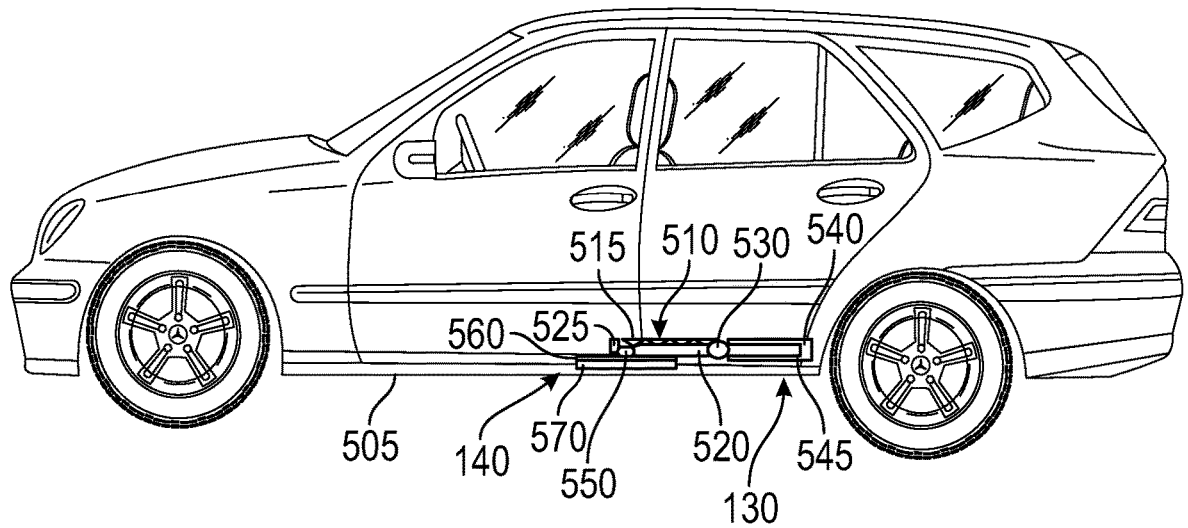
FIGS. 10N and 10O depict embodiments in which a braking system of the inventive concept is substantially or completely hidden from view when not in use.
Figure 10O:
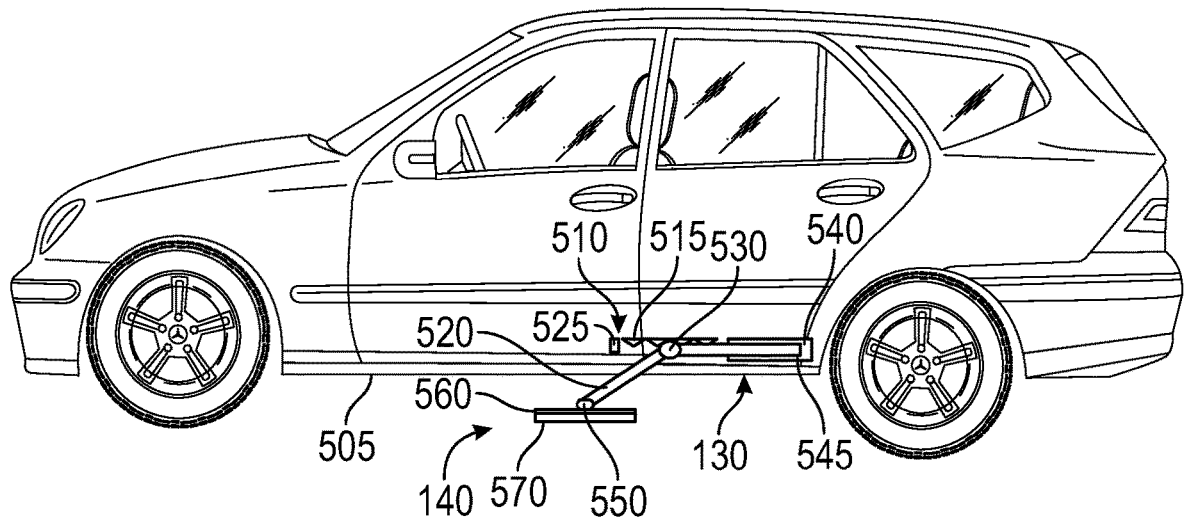

Additional embodiments incorporating the features shown in FIG. 10A to 10C are depicted in FIGS. 10D to 10O, which retain the element designations of FIG. 10A to 10C and are described below. Such alternative embodiments can include multiple reinforcing plates (560) and multiple friction surfaces in parallel or other arrangements, where each reinforcing plate may be attached to one or more than one deployment device. In such embodiments multiple length bars (520) can be coupled to a single reinforcing plate (560). FIG. 10D depicts a top-down view of an embodiment that includes a single reinforcing plate and two length bars arranged in parallel, with the braking system in a retracted position. FIG. 10E depicts the system of FIG. 10D in extended or braking configuration. FIG. 10F depicts a side view of the system of FIG. 10D as mounted to an SUV. FIG. 10G depicts a side view of the system of FIG. 10E as mounted to an SUV.

As noted above, the braking system can be provided as multiple braking subassemblies coupled to the same vehicle frame and/or undercarriage. FIG. 10I depicts an embodiment in which two braking subassemblies are arranged in a nested, parallel arrangement, with a pair of length arms associated with one reinforcing plate arranged within a second pair of length arms associated with a second reinforcing plate. FIG. 10I depicts a related configuration in which a two braking subassemblies are provided in an opposing, parallel arrangement, where length arms associated with a pair of reinforcing plates are arranged such that they oppose one another in extension. FIGS. 10J and 10K show related nested, parallel arrangements of braking subassemblies that include three or two subassemblies, respectively. Additionally, as shown in FIG. 10K there can be more than one reinforcing plates (560) and only one friction surface (570). Additionally, there may be multiple reinforcing plates (560) and multiple friction surfaces (570) where each friction element (130) may be connected to a dedicated force applicator (e.g. pneumatic device, etc) which may apply a certain pressure to each reinforcing plate, such that varied force may be applied to the driving surface through each individual friction surface (570). Alternatively, multiple brake subassemblies can be arranged in a grid pattern.

For example, as shown in FIG. 10M a brake subassembly can be associated with two or more wheels of the motor vehicle.

In some embodiments, the deployment mechanism (130) and friction device (140) are hidden from view in a retracted position and contained within the body of the vehicle undercarriage such that the bottom of the vehicle undercarriage is level, or very closely level. FIG. 10N depicts a side view of an example of such an embodiment in a retracted configuration. FIG. 10O depicts a side view of an example of such an embodiment in an extended or braking configuration. In other embodiments, the deployment mechanism (130) and friction device (140) are attached over the undercarriage and the surface of the vehicle undercarriage is not level.

A braking system of the inventive concept can include a housing unit (which can include an attachment frame for coupling to the vehicle) that serves to house and/or protect the braking pad and load bearing bars track. Such a housing unit can have a larger cross sectional area than the surface of the braking pad, for example to accommodate the longer connection bars, if required. Such longer or extended connection bars can be needed in order to contact the braking pad with the road. Similarly, in order to provide the desired forward or back position the connection bars can need to be longer or shorter than the frame.

A system of the inventive concept can be attached to a vehicle without the need for additional protection. For example, elements of the system can be weather proof and not require protection from weather, road debris, etc. As such in preferred embodiments no enclosure (such as a breakaway cover) is provided for storage of system components (e.g. braking pad, force applicator, load bearing bars, etc.) when not in use. This advantageously provides for rapid deployment of the braking device when needed.

During normal conditions all or some of the components of the braking system can be maintained in a retracted position, in which the friction device or braking pad is raised above the driving surface to provide adequate clearance for normal vehicle operations. The raised position of the load bearing bars and force applicator can be maintained by supplementary connection bars and/or a non-deployed position of the force applicator. In some embodiments the retracted position can be maintained by a biasing member (for example a spring, elastic, or biasing strut) that is distorted (e.g. compressed or stretched) during deployment of the brake, storing and subsequently providing sufficient energy to return the braking system to its retracted position following deployment of the brake. In some embodiments the force applicator can exert a force to maintain the braking system in its raised position, such that a friction pad of the device does not lower during everyday driving. In a preferred embodiment of the inventive concept no clips, pins, latches, or other mechanical devices are utilized that need to be cut, broken, or otherwise fragmented or structurally disrupted in order to deploy the braking system.

As noted above, embodiments of the inventive concept can include a friction pad that contacts the driving surface when in use. Such a friction pad can be attached to a reinforced surface, which is in turn coupled to load bearing bars of the system. This friction pad is strong and resistant to deformation when in contact with the driving surface, and can serve to protect the driving surface from contact with metal components of the braking system, advantageously avoiding damage to the driving surface. The friction pad can have treads, grooves, dimples or other indentations and/or protrusion to create increase fraction and/or traction with the driving surface when deployed.

Such a friction pad can have a front or leading edge that is oriented towards the front of the vehicle, and can be essentially perpendicular to the direction of travel. This leading edge can extend for a short distance (e.g. 1-10 inches (2.5 cm to 25.4 cm) from the front of the friction pad (edge closest to the front of the car), and can include an upwards curve or angle to prevent the friction pad from being caught, snagged, or otherwise damaged by debris, reflectors, road imperfections, etc. when deployed. In some embodiments at least a portion of the friction pad can be pliable and/or flexible in one or multiple locations across the area of the friction pad, for example from one side of the pad to the other. Alternatively, the entire friction pad can be pliant and/or flexible. In some embodiments, during deployment the rear portion (i.e. towards the rear of the vehicle) of the friction pad can be lowered from the raised position first followed by the front portion, angling the entire friction pad relative to the driving surface to similarly resist damage caused by debris, reflectors, and other raised items on the driving surface. In embodiments where the friction pad is pliant/flexible, the friction pad can be lowered at an angle relative to the driving surface (e.g. 10°, 15°, 20°, 25°, 30°, 35°, 40°, 45°, or greater than 45°, such that the rear portion of the friction pad contacts the road initially, followed by central and front portions of the friction pad.

In some embodiments one or more tracks can be positioned on the upper surface of the friction pad or the upper surface of a plate to which the friction pad is affixed, with the track(s) oriented along the front to rear axis of the friction pad. In such an embodiment connection bars can move through channels of the track to level the friction pad. Similarly, such connection bars can provide force to a rear portion of the friction pad (or an associated plate to which the friction pad is affixed) to bring it into contact with the driving surface before the front portion of the friction pad. In such an embodiment a pair of tracks can be provided (e.g. one near each of passenger and driver side edges of the friction pad), with two connection bars are movably engaged within channels or similar structures of each track. A back connection bar can coupled proximal to the rear portion of the friction pad to provide force to the rear of the friction pad. Similarly a front connection can be engaged with such a channel and move along the track towards the front of the friction pad, lowering the front portion of the friction pad as the front connection bar moves down the track. Relative proportions of such front and rear connection bars permit control of the angle at which the friction pad is applied to the driving surface.

Such a track can have break or cross channels perpendicular to the long axis of the track that permit the track the bend and/or become flexible at desired points, for example along portions where the friction pad is pliant or flexible. In some embodiments the friction pad can be flexible at two, three, four or more positions along the front to rear axis, thereby defining a number of segments. In such an embodiment multiple connection bars can be provided, for example one connection bar can be provided for each segment. During a braking operation such an arrangement permits the braking device to lower the segments of the friction pad in a sequence. For example, starting from the rear, lowering the rear-most connection bar and segment of the friction pad first, followed consecutively by the adjoining, progressively more forward-positioned segments of the friction pad. In such an embodiment each of the connection bars can apply a sustained force to the associated friction pad segment to provide braking force.

Alternatively, in some embodiments no track is provided and the friction pad is flexible or pliant in points to define segments across the width of the pad. In such embodiments a rigid backing plate can be fixed to a nonflexible portion of each segment (e.g. on the surface opposing the surface of the friction pad that contacts the driving surface) and at least one connection bar is coupled to each of the rigid backing plates. This permits lowering of each segment of the friction pad in a controlled sequence. Alternatively, the friction pad can be entirely flexible and coupled to multiple rigid backing plates with associated connection bars as described above. It should be appreciated that the connection bars can each exert a different pressure/force to the individual segment to which it is connected, to applying a differential pressure to different portions of the friction pad and subsequently providing control of the stopping distance for the vehicle.

In some embodiments such backing plates can be joined by flexible connection joints. The backing plates can be coupled to a relatively small portion (e.g. 5% to 30%) of the upper surface (i.e. the surface opposing the portion of the friction pad that contacts the driving surface) of the friction pad. Alternatively, the backing plates can be coupled to a relatively large portion (e.g. 50% to greater than 90%) of the upper surface (i.e. the surface opposing the portion of the friction pad that contacts the driving surface) of the friction pad.

Where there are separate portions of the pad that lower in a sequence using a track or rigid plate backing there can be many (e.g. 2, 3, 4, 5, etc.) individual segments that are lowered in a sequence that begins with the back (i.e. trailing) section first. In some embodiments additional segments can be deployed as needed to provide additional braking if required to slow the vehicle more quickly. This degree of control advantageously permits optimization of the applied braking force to avoid skidding and maintain vehicle control during operation.

In some embodiments the braking system can be mounted such that the friction pad is position at the underside of the car in front of the rear axle and suspension. When not in use the friction pad can be kept within the plane defined by the undercarriage of the vehicle, or slightly (i.e. 1 cm to 20 cm) below such a plane. When triggered, extension of a force applicator coupled to one or more connection/load bearing bar(s) can lower the friction pad from the stowed position within the vehicle. In a preferred embodiment the force applicator and the connection/load bearing bar(s) are arranged so that the connection bar and/or the force applicator is maintained at an angle (e.g. 5°, 10°, 15°, 20°, 25°, 30°, 35°, 40°, 45°, 50°, 55°, 60°, 65°, 70°, or greater than 70°) relative to vertical when deployed. This advantageously reduces lateral stresses on these components and effectively transfers the load of the braking force to the tracks associated with the ends of the connections bars that are not coupled with the friction pad and/or tracks associated with the friction pad.

The time required for the full deployment of the 'braking device' can be a short time interval (e.g. less than 1, 0.5, 0.25 0.1, and/or 0.01 seconds) from initiation of deployment. Such a 'deployment trigger' can be activated by a braking pedal and/or emergency brake of a vehicle, where the friction pad is deployed when the brake pedal is pressed beyond a certain point, using greater than a pre-determined amount of force, or is depressed at a greater than pre-determined speed. Such a triggering event can signal a controller to initiate the deployment. Alternatively an on-board or networked computer system can utilize sensors (IR and/or visible cameras, radar, LIDAR, acoustic proximity sensors, accelerometers, etc.) to provide data to an algorithm that can activate the brake system as deemed necessary, for example when an obstacle is detected or an impending collision is detected. It should be appreciated that such a braking system is especially particularly useful in autonomous driving systems to provide an additional element of safety.

As noted above a variety of force applicators (including pneumatic devices, hydraulic devices, linear electric motors, combustion motors, etc.) are suitable for use in deployment mechanisms employed by braking devices of the inventive concept. In some embodiments such a force applicator or deployment mechanism can utilize a controlled explosion to lower and/or raise the friction pad. For example, an ignition event can trigger a chemical reaction that produces a gas (such as nitrogen) that expands within an enclosure to provide force that drives the device. Such a chemical reaction can be provided by a propellant compound (such as a hydrazine, an azide a tetrazole, and/or a triazole), which can be used in combination with an oxidant (such as nitroguanidine and/or ammonium nitrate). Alternatively, a controlled explosion can be used in a pyrotechnic valve that provides rapid (i.e. less than 0.1 second) release a highly compressed gas (such as nitrogen or argon) from a reservoir. The reaction can be triggered mechanically or electrically, though spark generation, or another triggering system. The explosive compound or combination can be provided in a variety of forms, for example explosive liquids (e.g. fuels such as gasoline), explosive gasses, explosive liquids, explosive powders, explosive solids, and other rapidly igniting materials that can be ignited or triggered in a controlled environment such as a chamber (e.g. a piston cylinder, etc). Motive force can be provided by utilizing a chamber or enclosure housing the explosive, where such a chamber has two sides with an intervening with piston, where the piston is connected to a rod (or other connection device) which is connected to the pad. When the controlled explosion occurs on one of the sides of the piston it can drive the piston. It should be appreciated that such an arrangement can be used to lower the friction pad or to raise the friction pad.

When a braking system of the inventive concept is in a lowered position a locking mechanism can be used secure the load bearing bars to a reinforcing pad or rigid portion of the friction pad. In such an embodiment, when in the friction pad is in a deployed position sustained pressure or force from the force applicator is not needed to maintain the deployed position. Such a locking mechanism can include components integrated into the tracks that interface with the load bearing bars and components that are integrated at nor near at terminus of a load bearing bar that is interfaced with such a track. For example, such a track/load bearing bar interface can include complementary protrusions and indentations or complementary pins and apertures that can serve to mechanically secure the position of the load bearing bar relative to the track (e.g. preventing sliding) and thereby maintain the position of the friction pad.

In some embodiments of the inventive concept mechanical securing devices (e.g. ties, pins, etc.) are utilized to secure a friction pad and/or an associated reinforcing plate to load barring bars or a force applicator. In such an embodiment load bearing bars are integrally formed with the reinforced portion of the friction pad or a reinforcing plate associate with the friction pad. Alternatively, load bearing bars can be coupled to one or more swivel device on the upper surface of a reinforced portion of the friction pad (or a reinforcing plate associated with the friction pad) without the need for mechanical fasteners. Such an arrangement advantageously reduces the weight and complexity of the braking system.

In some embodiments only a single set of load bearing bars is utilized, and the entire weight of the vehicle can be supported through deployment of the braking system (e.g. by activation of a force applicator of the braking system). In such embodiments of the friction pad can raise the rear car tires of the vehicle from the driving surface on initial deployment of the braking device system or subsequently during full deployment. In some embodiments the deployed friction pad does not raise the front tires, which advantageously maintains steering functions of the vehicle. In still other embodiments the braking system does not raise the rear tires from the driving surface in order to maintain the benefit of braking from all four tires. It should be appreciated that a single braking system of the inventive concept can be used in either of these modes, as dictated by the vehicle operator and/or conditions at the time of deployment.

During integration of a braking system of the inventive concept with a vehicle a supporting frame can be first attached to the underside of the vehicle, preferably above or parallel to the rear axle and rear suspension. Such a supporting frame can include or be used to support tracks, which can include channels. Connection bars or load bearing bars can be coupled either to such tracks (for example, by interfacing a terminus (for example, a primary terminus) of a load bearing bar with a channel of the track) or otherwise coupled to the supporting frame. A friction pad can then be attached to the remaining or secondary terminus of the load bearing bar. This can be accomplished by interfacing this secondary terminus with a track associated with the friction pad (for example, by interfacing with a channel of such a track). In some embodiments such a track is coupled to a reinforcing plate that is attached to the friction pad. The supporting frame is preferably positioned to secure the load bearing bars below or parallel with the rear axle and rear suspension of the vehicle, such that when the friction pad is in its raised position the supporting frame is substantially above or parallel with the rear axle and suspension and the friction pad is substantially below or parallel with the rear axle and rear suspension. This arrangement advantageously directs forces incurred during braking to the load bearing bars, and subsequently to the supporting frame, thereby avoiding application of such force to the force applicator. Alternatively, a force applicator can be designed to carry a portion of the force applied on the friction device (140) during deployment.

Alternatively, one or more connecting or load bearing bars can be attached, fused, or otherwise coupled to one at least one component of the underside of the vehicle, such as one or vehicle frame members, rear axle, and/or differential. In such embodiment there is no supporting frame, and the connection bars are secured directly to the underside of the vehicle via at least one point. The connection area can be dependent on the area of the primary (i.e. upper) terminus of the connection bars. The connection area can between 4 sq inches to 40 sq inches (100 $cm^2$ to 1000 $cm^2$). In such an embodiment the connecting/load bearing bars and other elements of the deployment mechanism can be directly fastened to the rear axle. Deployment mechanism (130), friction device (140), and other components of the braking system can be attached to the undercarriage of the vehicle in any suitable fashion, including being welded directly to the frame of the vehicle, integrally formed with components of the vehicle, secured with mechanical ties to components of the vehicle, etc.

In some embodiments a complementary system can be deployed when maximum braking power is applied through the friction pad. In extreme scenarios where maximum braking power is applied (for example, to avoid an accident) airbags can be deployed within the vehicle cabin in order to avoid or reduce injuries to the occupants (such as facial injuries). Alternatively, a secondary airbag can be installed that deploys with less force than the vehicle's primary airbag. This secondary airbag can be coupled to the braking system such that when the extreme braking force is applied the secondary airbag is deployed and positioned to prevent facial injury. In a preferred embodiment such a this secondary airbag is deployed in a non-destructive fashion and/or can be reused.

It should be apparent to those skilled in the art that many more modifications besides those already described are passible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A braking device for a vehicle, the braking device comprising:
    a track configured to couple to an underside of the vehicle, the track including one or more stopping features disposed along a length thereof;
    a force applicator configured to couple to the underside of the vehicle;
    a connection device extending from the force applicator, the connection device including:
        a bar having a first end and an opposing second end;
        a first pivotable connector positioned at the first end, the first pivotable connector coupling the bar to the force applicator, wherein the first pivotable connector engages with and moves along the track, wherein the first pivotable connector is configured to selectively engage with the one or more stopping features, and wherein the one or more stopping features permit movement of the first pivotable connector in a first direction along the track but inhibit or selectively inhibit movement of the first pivotable connector in an opposing second direction along the track; and
        a second pivotable connector positioned at the opposing second end; and
    a pad coupled to the second pivotable connector;
    wherein the first pivotable connector is configured to facilitate rotating the bar between a non-deployed orientation and a deployed orientation, the non-deployed orientation substantially parallel to the underside of the vehicle and the deployed orientation non-parallel to the underside of the vehicle; and wherein the pad is configured to contact a traveling surface for the vehicle when the bar is in the deployed orientation.

2. The braking device of claim 1, wherein the force applicator at least one of:
(a) is configured to exert a force between the underside of the vehicle and the pad via the connection device;
(b) is configured to control rotation of the connection device;
(c) is configured to resist rotation of the connection device away from the deployed orientation; or
(d) comprises one or more of a pneumatic device, a hydraulic device, a solenoid device, a mechanical tension device, a projectile firing device, an explosive or pyrotechnic device, an electric motor, or a combustion motor.

3. The braking device of claim 1, wherein the one or more stopping features are selectively retractable to permit movement of the first pivotable connector in the opposing second direction.

4. The braking device of claim 1, wherein the one or more stopping features have an asymmetric shape.

5. The braking device of claim 1, wherein the track defines an open, downward facing channel with the one or more stopping features positioned along one or both sides of the open, downward facing channel, and wherein the first pivotable connector is disposed within the track and the bar extends through the open, downward facing channel.

6. The braking device of claim 1, further comprising a piston configured to engage with the bar to pivot the bar about the first pivotable connector when transitioning from the non-deployed orientation and the deployed orientation.

7. The braking device of claim 1, wherein the pad is configured to (a) be hidden within a body of the vehicle when the bar is in the non-deployed orientation and (b) extend from the body and be visible when the bar is in the deployed orientation.

* * * * *